(12) United States Patent  (10) Patent No.: US 8,982,858 B2
Motonami et al.  (45) Date of Patent: Mar. 17, 2015

(54) WIRELESS COMMUNICATION APPARATUS, INFORMATION PROCESSING APPARATUS, AND WIRELESS COMMUNICATION CONTROL METHOD

(71) Applicant: Fujitsu Limited, Kawasaki-shi, Kanagawa (JP)

(72) Inventors: Yusuke Motonami, Kawasaki (JP); Naozumi Anzai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 13/644,247

(22) Filed: Oct. 3, 2012

(65) Prior Publication Data

US 2013/0058320 A1 Mar. 7, 2013

Related U.S. Application Data

(63) Continuation of application No. PCT/JP2010/056235, filed on Apr. 6, 2010.

(51) Int. Cl.
*H04W 28/22* (2009.01)

(52) U.S. Cl.
CPC ............... *H04W 28/22* (2013.01); *Y02B 60/50* (2013.01)
USPC .......................................................... 370/338

(58) Field of Classification Search
CPC ............................... Y02B 60/50; H04W 28/22
USPC ................................ 370/311, 338; 455/343.1
See application file for complete search history.

(56) References Cited

U.S. PATENT DOCUMENTS

| 2003/0182309 | A1  |  9/2003 | Namekata et al.            |
|--------------|-----|---------|----------------------------|
| 2006/0209176 | A1* |  9/2006 | Nakamura et al. ... 348/14.01 |
| 2006/0268788 | A1* | 11/2006 | Harris et al. ........ 370/335 |
| 2007/0004376 | A1* |  1/2007 | Kogure ............. 455/343.5 |
| 2007/0081504 | A1* |  4/2007 | Shih et al. ........... 370/338 |
| 2007/0217357 | A1  |  9/2007 | Kitakado                   |
| 2008/0049695 | A1  |  2/2008 | Ogura                      |
| 2008/0240009 | A1* | 10/2008 | Min et al. ............ 370/311 |
| 2008/0298528 | A1  | 12/2008 | Fukushima                  |
| 2009/0103435 | A1* |  4/2009 | Celentano et al. ...... 370/232 |

FOREIGN PATENT DOCUMENTS

CN 101052002 10/2007
CN 101552726 10/2009

(Continued)

OTHER PUBLICATIONS

Patent Abstracts of Japan, Publication No. 2003-283545, Published Oct. 3, 2003.

(Continued)

*Primary Examiner* — Paul H Masur
(74) *Attorney, Agent, or Firm* — Staas & Halsey LLP

(57) ABSTRACT

An input unit inputs input data. A priority determination unit determines priority of the data input by the input unit. A speed control unit sets the communication speed of the wireless communication of the data to be output from an output unit according to the priority of the data determined by the priority determination unit, and also, when input of the data is not detected, sets the communication speed of the wireless communication of the data to be output from the output unit to be lower than the communication speed when the input of the data is detected. The output unit outputs output data by the wireless communication at the set communication speed.

12 Claims, 25 Drawing Sheets

(56) References Cited

FOREIGN PATENT DOCUMENTS

| | | |
|---|---|---|
| EP | 1 681 883 | 7/2006 |
| EP | 1843530 A2 | 10/2007 |
| JP | 2002-125002 | 4/2002 |
| JP | 2003-169363 | 6/2003 |
| JP | 2003-283545 | 10/2003 |
| JP | 2004-356855 | 12/2004 |
| JP | 2007-179555 | 7/2007 |
| JP | 2008-299612 | 12/2008 |
| WO | WO 2005/043945 | 5/2005 |

OTHER PUBLICATIONS

Patent Abstracts of Japan, Publication No. 2002-125002, Published Apr. 26, 2002.
English Abstract of WO 2005/043945, Published May 12, 2005 (included in AE).
Patent Abstracts of Japan, Publication No. 2003-169363, Published Jun. 13, 2003.
Patent Abstracts of Japan, Publication No. 2004-356855, Published Dec. 16, 2004.
International Search Report mailed Jul. 13, 2010 in PCT/JP2010/056235.
Japanese Office Action issued Sep. 17, 2013 in corresponding Japanese Patent Application No. 2012-509224.
Patent Abstracts of Japan, Publication No. 2007-179555, Published Jul. 12, 2007.
Patent Abstracts of Japan, Publication No. 2008-299612, Published Dec. 11, 2008.
Chinese Office Action issued Nov. 4, 2014 in corresponding Chinese Patent Application No. 201080067207.0.
Espacenet English Abstract of Chinese Publication No. 101052002, Published Oct. 10, 2007.
Espacenet English Abstract of Chinese Publication No. 101552726, Published Oct. 7, 2009.

* cited by examiner

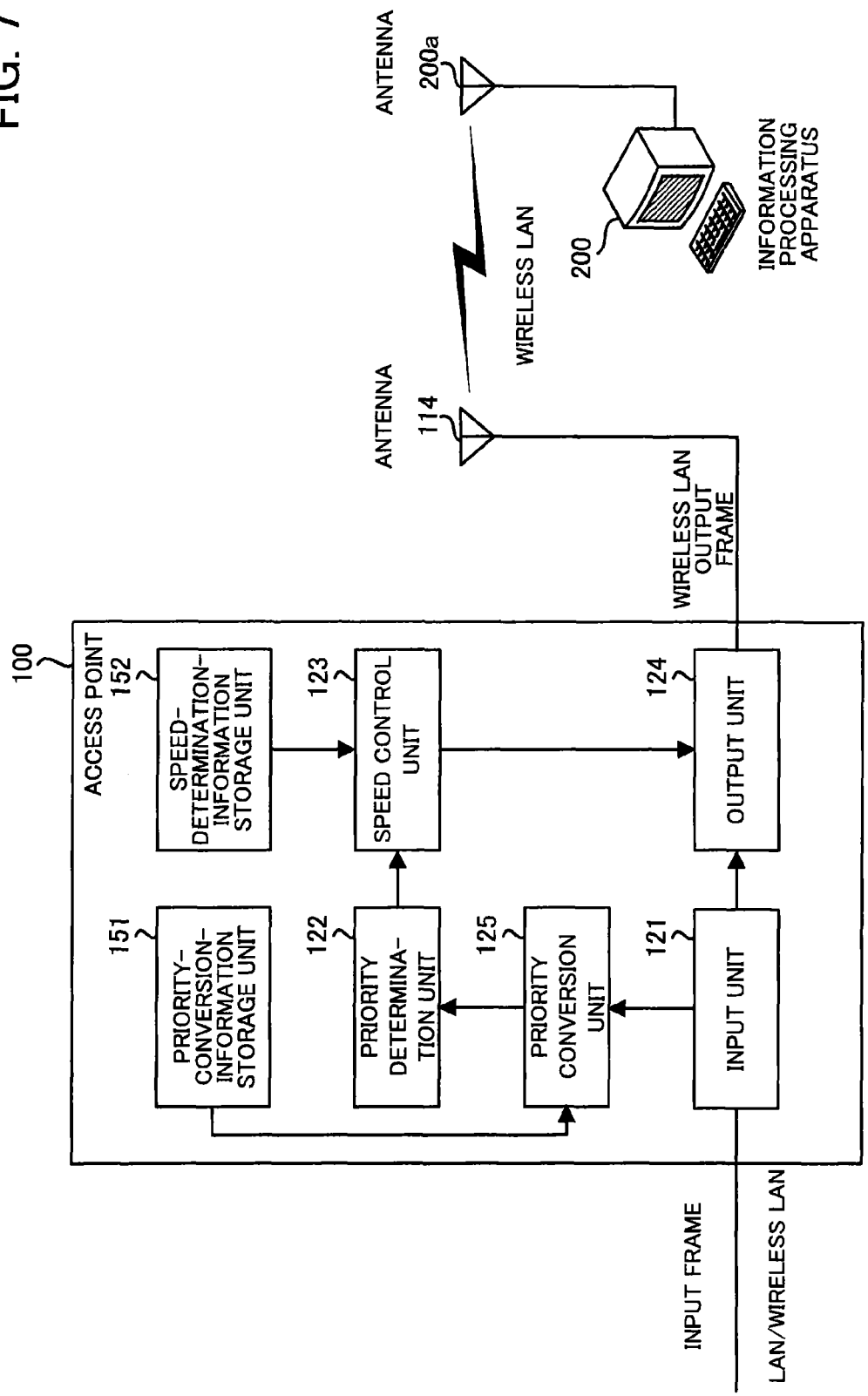

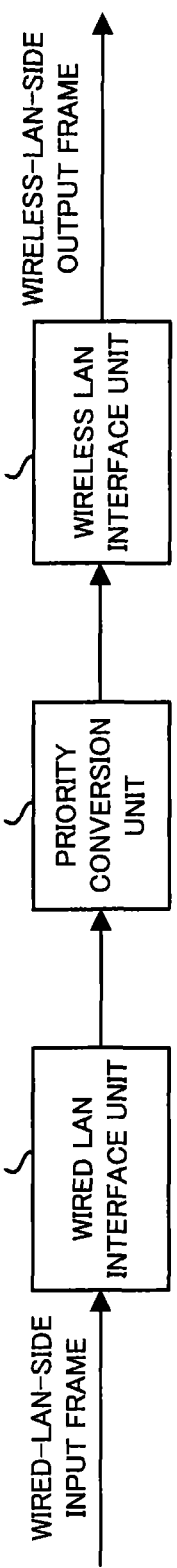

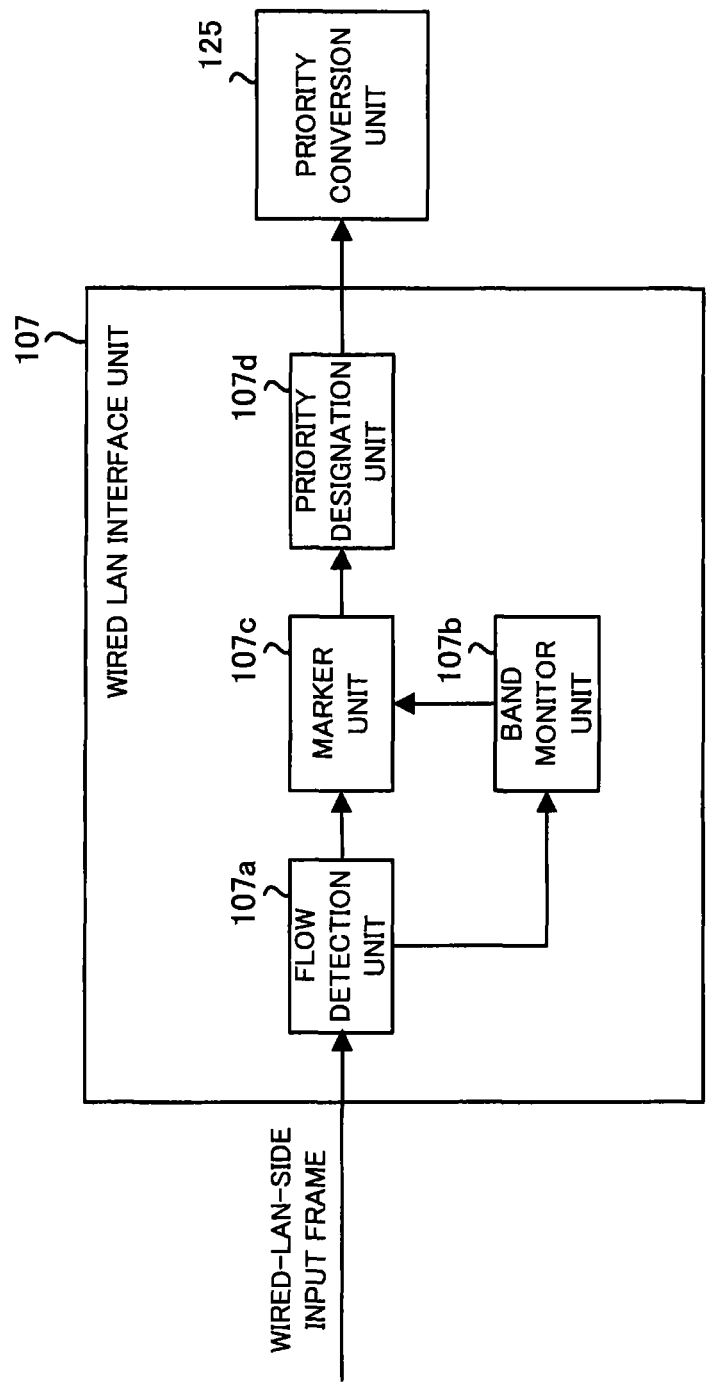

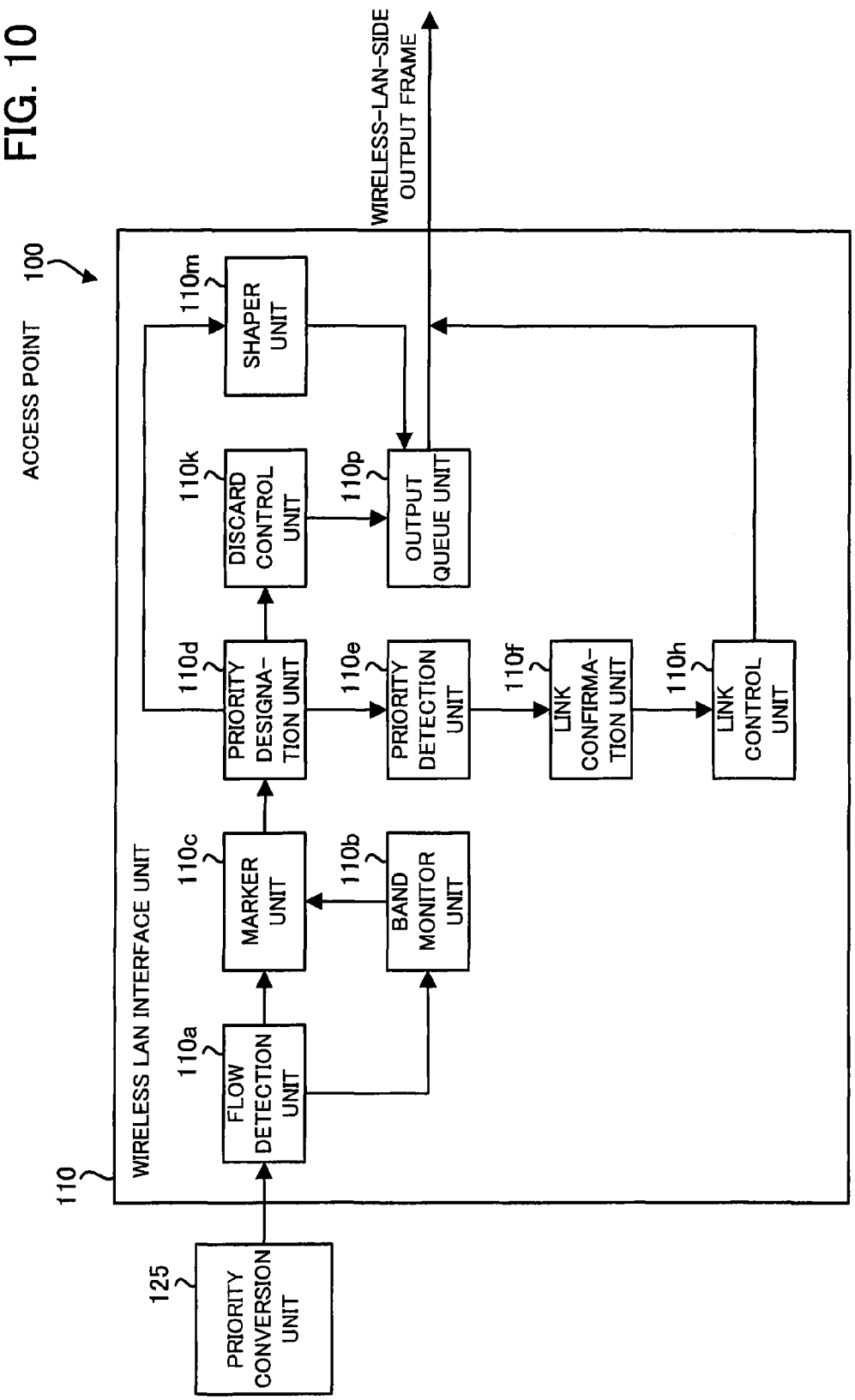

FIG. 11

PRIORITY CONVERSION TABLE    151a

| LAN PRIORITY (IEEE 802.1P USER PRIORITY) | WIRELESS LAN PRIORITY (IEEE 802.1e ACCESS CATEGORY) |
|---|---|
| (1) Background (BACKGROUND TRAFFIC) | (1) AC_BK (BACKGROUND TRAFFIC ACCESS CATEGORY) |
| (2) Spare (SPARE) | |
| (0) Best Effort (NO PRIORITY DESIGNATION) | (2) AC_BE (BEST EFFORT DATA ACCESS CATEGORY) |
| (3) Excellent Effort (HIGH PRIORITY) | |
| (4) Controlled Load (GUARANTEED BANDWIDTH) | (3) AC_VI (VIDEO DATA ACCESS CATEGORY) |
| (5) Video (VIDEO DATA) | |
| (6) Voice (AUDIO DATA) | (4) AC_VO (AUDIO DATA ACCESS CATEGORY) |
| (7) Network Control (NETWORK CONTROL) | |

LOW ↑ PRIORITY ↓ HIGH

WIRELESS COMMUNICATION APPARATUS, INFORMATION PROCESSING APPARATUS, AND WIRELESS COMMUNICATION CONTROL METHOD

CROSS-REFERENCE TO RELATED APPLICATION

This application is a continuation application of International Application PCT/JP2010/056235 filed on Apr. 6, 2010 and designated the U.S., the entire contents of which are incorporated herein by reference.

FIELD

The embodiments discussed herein relate to a wireless communication apparatus, an information processing apparatus, and a wireless communication control method.

BACKGROUND

Recently, energy saving is generally required for various apparatuses such as Energy Star according to a rise in the awareness of the global environmental issue and the energy issue. This is not exceptional for wireless communication apparatuses and reduction of power consumption is required during wireless communication.

Here, in a wireless communication method such as a Wireless LAN (Wireless Local Area Network), for example, it is generally possible to perform connection always at a possible highest speed by dynamically changing communication speed according to a radio wave state.

PTL 1: Japanese Laid-Open Patent Publication No. 2003-169363
PTL 2: Japanese Laid-Open Patent Publication No. 2004-356855

The power consumption during wireless communication, however, is generally different depending on a communication standard, a communication mode, a wireless transmission rate, and the like. For example, in the high speed communication of IEEE 802.11n using a MIMO (Multi Input Multi Output) technique, power consumption of a control chip is increased by several hundred milli-watts during wireless communication compared with conventional IEEE 802.11a, 802.11b, 802.11g, and the like. In addition, the power consumption is further increased in the operation of the high-throughput mode (HT40) using a bandwidth of 40 MHz which is twice the conventional bandwidth.

Here, when high-speed communication is always required, it is effective to always use such a high-speed technique. However, there is a problem that it consumes useless power and is not preferable from the viewpoint of energy saving to keep a state in which high-speed communication with a high power consumption is possible, although such a communication method does not always provide high-speed data communication and communication in which high-quality assurance is required (further, data communication itself) in a network using wireless communication.

SUMMARY

According to an aspect, there is provided a wireless communication apparatus, including: an input unit configured to input data; a priority determination unit configured to determine priority of the data; an output unit configured to output the data by wireless communication at a set communication speed; and a speed control unit configured to set the communication speed of the wireless communication of the data to be output from the output unit according to the priority of the data determined by the priority determination unit, and also, when input of the data is not detected, to set the communication speed of the wireless communication of the data to be output from the output unit to be lower than the communication speed to be set when the input of the data is detected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a block diagram illustrating a configuration of an access point of the second embodiment;
FIG. 8 illustrates an outline of the access point of the second embodiment;
FIG. 9 is a block diagram illustrating a configuration of a wired LAN interface unit of the second embodiment;
FIG. 10 is a block diagram illustrating a configuration of a wireless LAN interface unit of the second embodiment;
FIG. 11 illustrates a priority conversion table of the second embodiment.

DESCRIPTION OF EMBODIMENTS

Hereinafter, the embodiments will be explained with reference to the drawings.

[First Embodiment]

Figure 1:
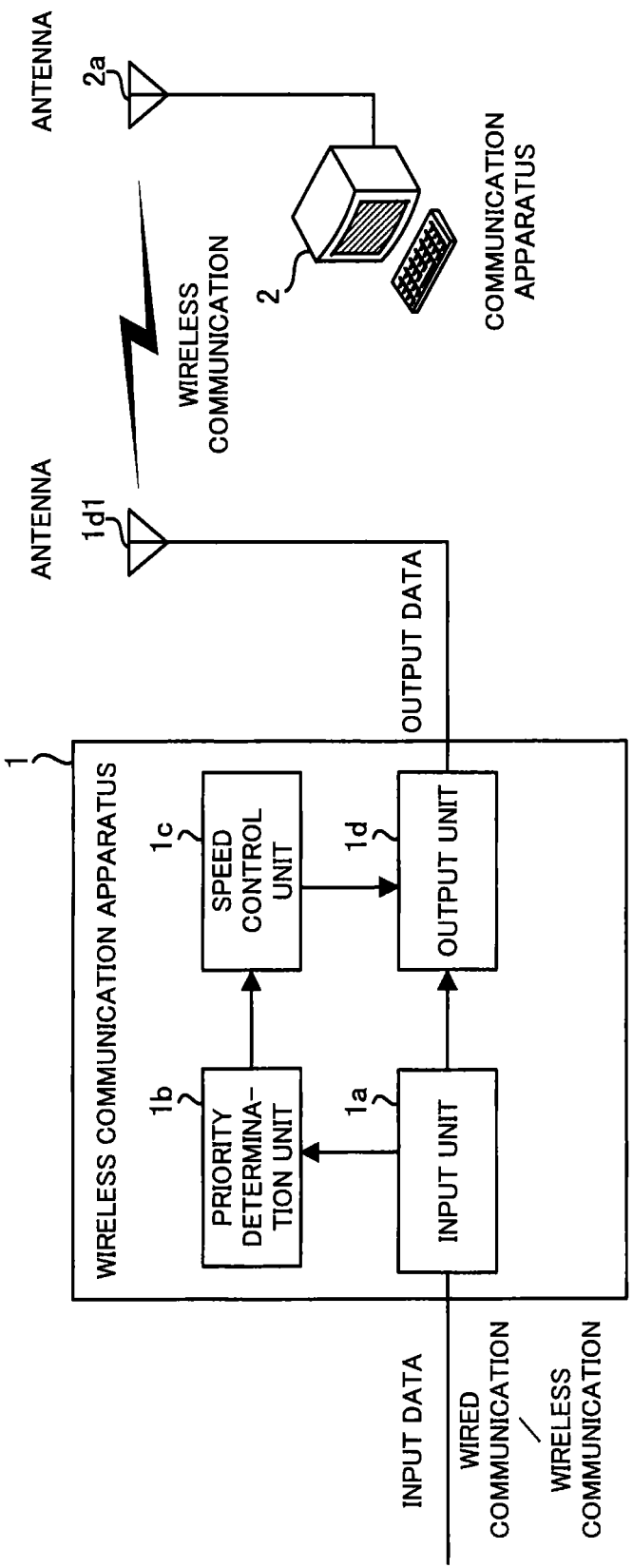
FIG. 1 illustrates a wireless communication apparatus of a first embodiment.

FIG. 1 illustrates a wireless communication apparatus of a first embodiment. A wireless communication apparatus 1 illustrated in FIG. 1 is a wireless communication apparatus which changes communication speed according to data priority. The wireless communication apparatus 1 includes an input unit 1a, a priority determination unit 1b, a speed control unit 1c and an output unit 1d. Further, the output unit 1d is connected with an antenna 1d1.

The input unit 1a is connectable with an apparatus having a wireless communication function and a wired communication function such as another communication apparatus and an information processing apparatus by wired communication or wireless communication. The input unit 1a inputs input data transmitted from such an apparatus.

The priority determination unit 1b determines priority of the data input by the input unit 1a. The data priority may be determined according to information indicating whether or not the data is required to be transmitted at high speed, such as Priority which indicates QoS (Quality of Service) setting and is included in VLAN (Virtual LAN) Tag in a LAN frame (Local Area Network frame) of a wired LAN or wireless LAN or in ToS (Type of Service) Field in an IP (internet Protocol) packet, Destination Address similarly included in the LAN frame or the IP packet, and Destination Port Number included in the IP packet, which are indicated by a control signal included in information of a header of the data.

Here, QoS is a technique which reserves a band for some particular communication and assures a certain communication speed, and is used in a service in which communication delay or interruption is preferred to be prevented, such as voice or video real time delivery and a TV phone. QoS standard includes IEEE 802.1p, IEEE 802.11e and the like.

The speed control unit 1c sets a communication speed of the wireless communication of the data to be output from the output unit 1d according to the data priority determined by the priority determination unit 1b, and also, when input of the data is not detected, sets the communication speed of the wireless communication of the data to be output from the output unit 1d to be lower than the communication speed when input of the data is detected. Accordingly, it is possible to output the data by the wireless communication from the output unit 1d at a communication speed according to the priority determined by the priority determination unit 1b.

The output unit 1d outputs output data by the wireless communication at the set communication speed. The data output from the output unit 1d is transferred to another wireless communication apparatus or the like from the antenna 1d1 by the wireless communication such as a wireless LAN or the like.

Accordingly, the communication speed of the data having a lower priority is suppressed by changing the communication speed according to the data priority of the wireless communication, and thereby it becomes possible to reasonably reduce high-speed communication with a large amount of power consumption to realize power saving.

[Second Embodiment]

Figure 2:
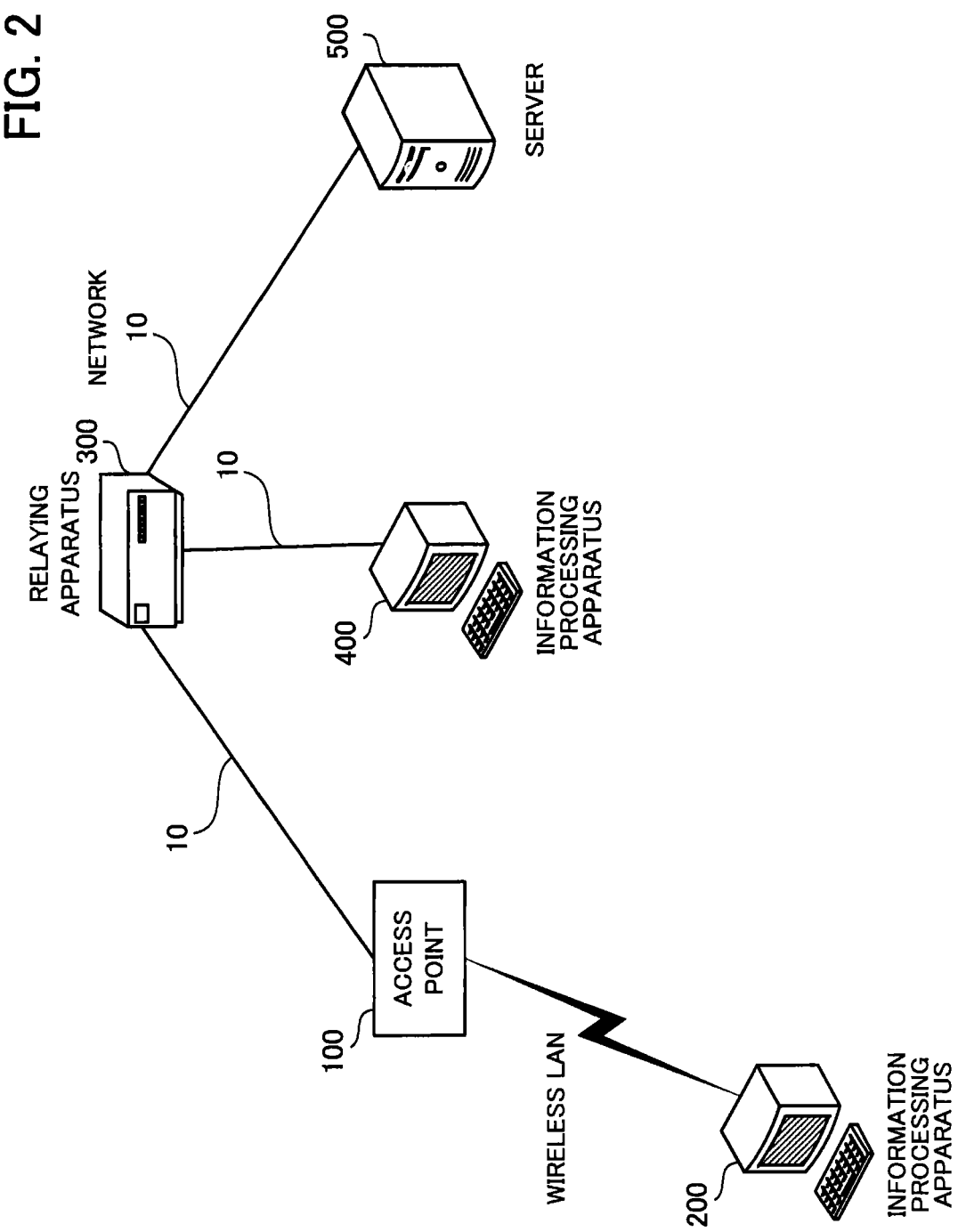
FIG. 2 illustrates an entire configuration of a communication system of a second embodiment.

FIG. 2 illustrates an entire configuration of a communication system of a second embodiment. In the communication system of the present embodiment, an access point 100 of the present embodiment relays a frame of a data link layer so as to cause data transmission and reception to be performed between an information processing apparatus 200 having a communication function by the wireless LAN and an information processing apparatus which is connected by a network 10 such as an information processing apparatus 400 and a server 500. Here, while a data unit of Layer 2 in the OSI (Open System Interconnection) reference model is sometimes called a packet, the data unit is expressed as a frame in a unified manner for all the cases in the second embodiment, for convenience of explanation.

The communication system illustrated in FIG. 2 includes the access point 100, the information processing apparatuses 200 and 400, a relaying apparatus 300, and the server 500. The access point 100 is connected with the information processing apparatus 400 and the server 500 by the network 10 via the relaying apparatus 300. While the network 10 may be configured with a wired LAN, for example, the network 10 may be configured with another type such as a wireless LAN or a dedicated line, not limited to the wired LAN.

The access point 100 has a communication function by the wireless LAN and is connectable with the information processing apparatus 200 by the wireless LAN.

The information processing apparatus 200 is an information processing apparatus to be used by a user such as a computer. The information processing apparatus 200 may perform data communication with the information processing apparatus 400 and the server 500 via the access point 100 and the relaying apparatus 300. Thereby, for example, the information processing apparatus 200 may perform phone call using an IP phone or a TV phone and data communication with the information processing apparatus 400, acquire video and voice contents delivered from the server 500 and perform data download.

The relaying apparatus 300 relays a frame from a transmission source node to a destination node in the data communication between nodes of the access point 100, the information processing apparatus 400, the server 500, and the like.

The information processing apparatus 400 is an information processing apparatus to be used by another user such as a computer. The information processing apparatus 400 is connected with the relaying apparatus 300 via the network 10 and also further may perform communication with the information processing apparatus 200 via the access point 100. The information processing apparatus 400 has a function of performing phone call using an IP phone or a TV phone, data communication, and the like with the information processing apparatus 200.

The server 500 is an information processing apparatus capable of delivering stored data by data communication. The server 500 is connected with the relaying apparatus 300 via the network 10 and also further may perform communication with the information processing apparatus 200 via the access point 100. The server 500 has a function of delivering video and voice contents or data to the information processing apparatus 200 by the communication with the information processing apparatus 200.

Figure 3:
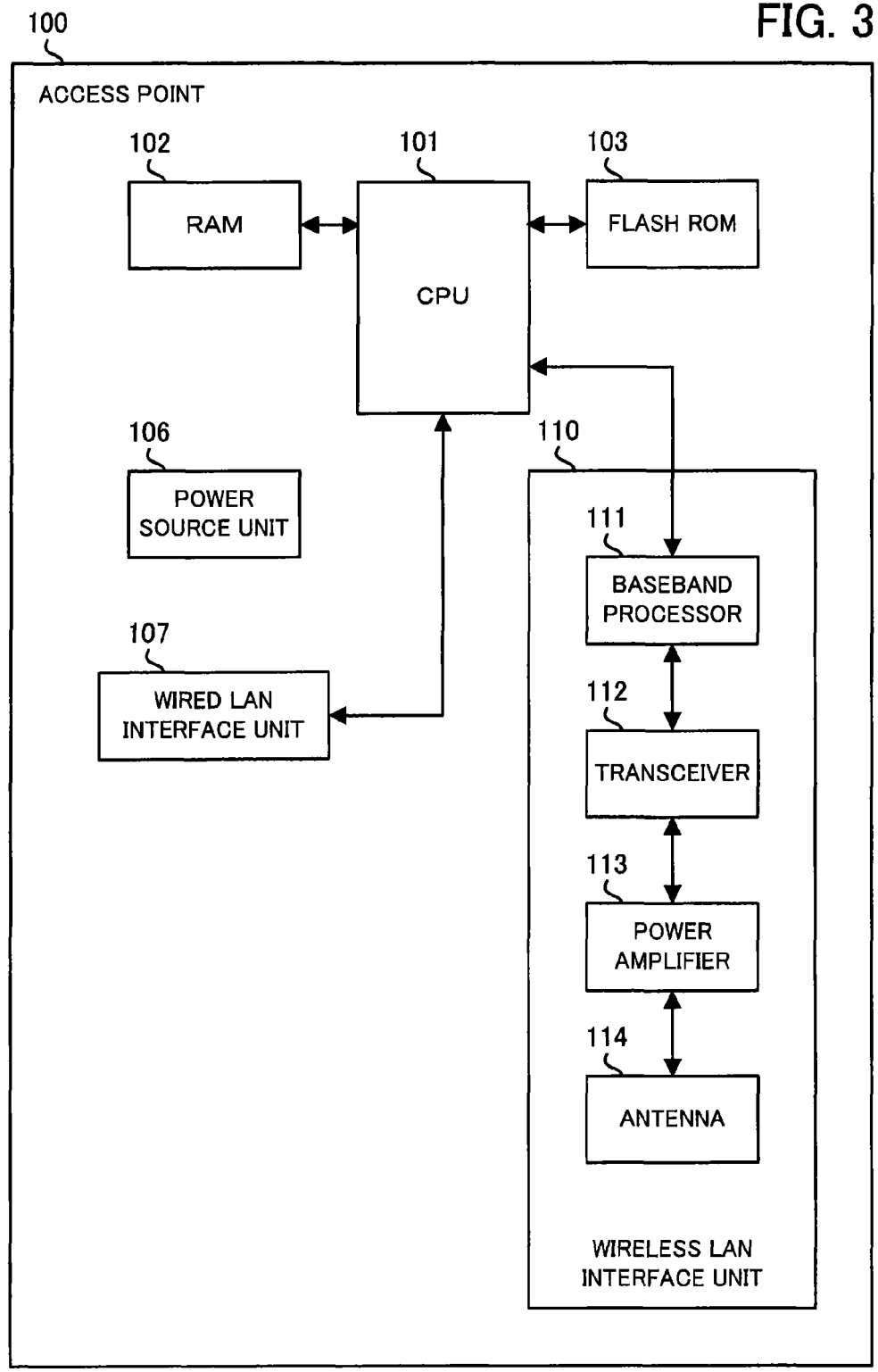
FIG. 3 illustrates a hardware configuration of an access point of the second embodiment.

FIG. 3 illustrates a hardware configuration of the access point of the second embodiment. The access point 100 is a communication apparatus provided with a wireless and wired communication function, and, as illustrated in FIG. 3, includes a CPU (Central Processing Unit) 101, a RAM (Random-Access Memory) 102, a Flash ROM (Flash Read-Only Memory) 103, a power source unit 106, a wired LAN interface unit 107, and a wireless LAN interface unit 110.

The CPU 101 controls the entire access point 100. The CPU 101 executes processing according to a program. The CPU 101, using data stored in the Flash ROM 103, executes a program stored in the same Flash ROM 103. The CPU 101 receives a command transmitted from another apparatus such as the information processing apparatus 200 via the wired LAN interface unit 107 or the wireless LAN interface unit 110, and also sends an execution result to another apparatus in response to the command.

The RAM 102 is used as a work area and stores various kinds of data used for the communication and control of the access point 100. The Flash ROM 103 is an example of a program recording unit and a data recording unit, and stores an OS (Operating System) and an application program and also stores various kinds of table such as a priority conversion table and a speed determination table in the data recording unit.

The power source unit 106 supplies drive power to each of the units such as the CPU 101 and the wireless LAN interface unit 110.

The wired LAN interface unit 107 is an interface performing communication connection by the wired LAN for an apparatus connected by the wired LAN and having a communication function.

The wireless LAN interface unit 110 is an interface performing communication connection by the wireless LAN for a connection apparatus having a communication function capable of wireless LAN connection. The wireless LAN interface unit 110 includes a baseband processor 111, a transceiver 112, a power amplifier 113, and an antenna 114.

The baseband processor 111 generates a baseband signal for information transmission and reception. The transceiver 112 modulates a carrier signal using the baseband signal to generate a transmission signal, or demodulates the baseband signal from a reception signal. The power amplifier 113 amplifies the transmission signal or the reception signal. The antenna 114 transmits the transmission signal output from the power amplifier 113 as a wireless signal to another apparatus capable of communication by the wireless LAN such as the information processing apparatus 200, or receives a wireless signal from another apparatus and inputs the wireless signal to the power amplifier 113 as the reception signal.

Figure 4:
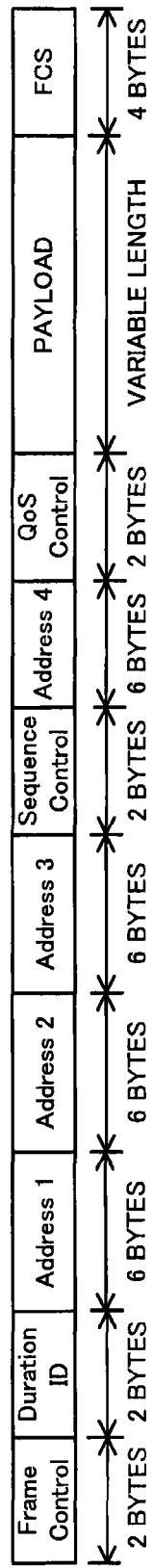
FIG. 4 illustrates a data structure example in a frame of a wireless LAN of the second embodiment.

FIG. 4 illustrates a data structure example of a wireless LAN frame of the second embodiment. In the present embodiment, the frame illustrated in FIG. 4 is transmitted to and received by the information processing apparatus 200 connected by the wireless LAN via the wireless LAN interface unit 110 of the access point 100 which is described previously in FIG. 2.

The frame illustrated in FIG. 4 has a MAC frame format of IEEE 802.11e, and includes Frame Control of a 2-byte region, Duration ID of a 2-byte region, Address 1 of a 6-byte region, Address 2 of a 6-byte region, Address 3 of a 6-byte region, Sequence Control of a 2-byte region, Address 4 of a 6-byte region, QoS Control of a 2-byte region, Payload of a variable-length region, and FCS (Frame Check Sequence) of a 4-byte region.

Here, QoS Control indicates priority order of the wireless LAN frame of IEEE 802.11e. QoS Control indicates a priority order level of the frame to be used for priority order setting of traffic by four-level access category.

Figure 5:
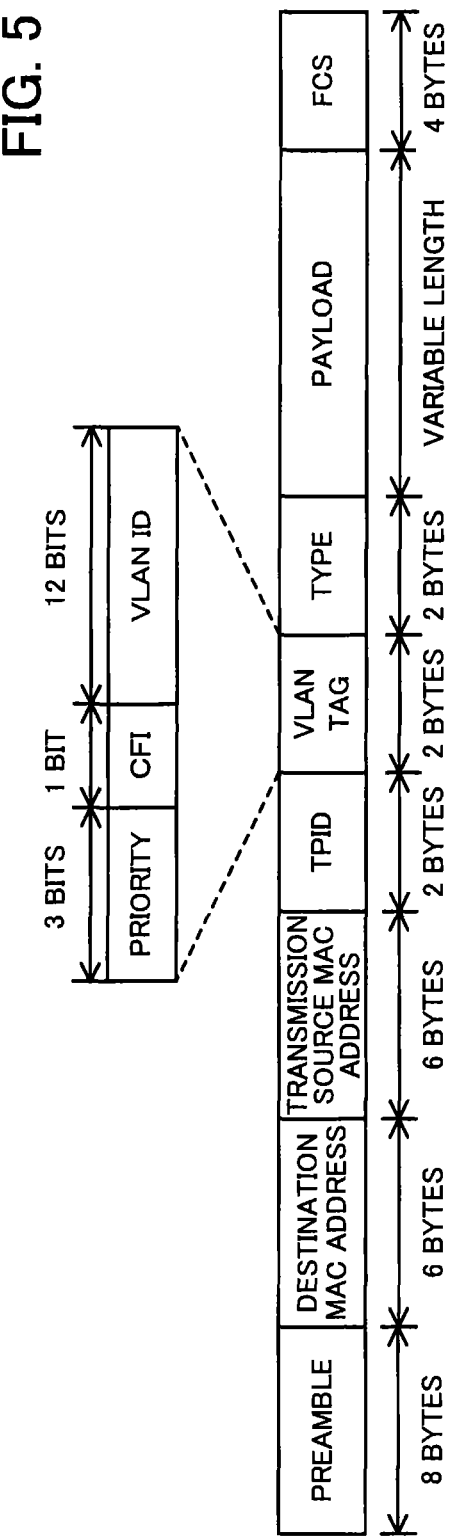
FIG. 5 illustrates a data structure example in a frame of a wired LAN of the second embodiment.

FIG. 5 illustrates a data structure example of a frame of a wired LAN of the second embodiment. In the present embodiment, the frame illustrated in FIG. 5 is transmitted to and received from the relaying apparatus 300 connected by the network 10 via the wired LAN interface unit 107 of the access point 100 which is described previously in FIG. 2.

The frame illustrated in FIG. 5 includes Preamble of an 8-byte region, Destination MAC Address of a 6-byte region, Transmission Source MAC Address of a 6-byte region, TPID (Tag Protocol Identifier) of a 2-byte region, VLAN Tag of a 2-byte region, Type of a 2-byte region, Payload of a variable-length region, and FCS (Frame Check Sequence) of a 4-byte region. Further, VLAN Tag includes Priority of a 3-bit region, CFI (Canonical Format Indicator) of a 1-bit region, and VLAN ID of a 12-bit region.

Here, Priority included in VLAN Tag indicates the priority order of IEEE 802.1p. Priority indicates frame priority order to be used for traffic priority order setting by eight levels.

The access point 100 of the present embodiment determines a wireless LAN link speed according to the priority of the wireless LAN frame. When the wireless LAN link speed is determined according to the priority of the wireless LAN frame, the access point 100 obtains priority of the frame communicated in the wireless LAN communication according to QoS Control of the wireless LAN frame illustrated in FIG. 4. Next, the access point 100 determines the wireless LAN link speed according to the obtained wireless LAN frame priority.

Further, the access point 100 may also determine the wireless LAN link speed according to wired LAN frame priority. When the link speed is determined according to the wired LAN frame priority, the access point 100 obtains the priority of the frame communicated by the LAN according to Priority of VLAN Tag in the wired LAN frame illustrated in FIG. 5. Next, the access point 100 converts the obtained wired LAN frame priority into the wireless LAN priority and determines the wireless LAN link speed according to the wireless LAN priority obtained by the conversion.

Figure 6:
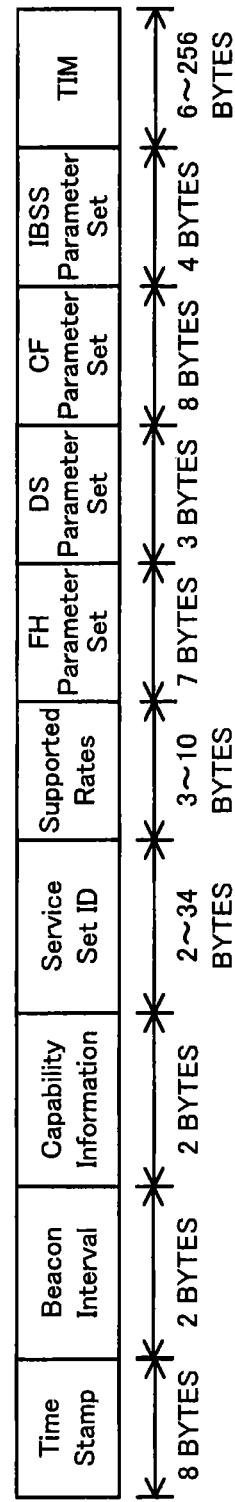
FIG. 6 illustrates a data structure example in a Beacon frame of the wireless LAN of the second embodiment.

FIG. 6 illustrates a data structure example of a Beacon frame of the wireless LAN of the second embodiment. In the present embodiment, the Beacon frame illustrated in FIG. 6 is transmitted by broadcast communication from the wireless LAN interface unit 110 of the access point 100 to the information processing apparatus 200 and thereby passive scanning is performed.

The Beacon frame illustrated in FIG. 6 includes Time Stamp of an 8-byte region, Beacon Interval of a 2-byte region, Capability Information of a 2-byte region, Service Set ID of a 2 to 34-byte region, Supported Rates of a 3 to 10-byte region, FH Parameter Set of a 7-byte region, DS Parameter Set of a 3-byte region, CF Parameter Set of an 8-byte region, IBSS Parameter Set of a 4-byte region, and TIM (Traffic Indication Message) of a 6 to 256-byte region.

Here, Supported Rates is a region where the link speed is set by the access point 100 in speed control processing of the present embodiment. Beacon including this Supported Rates in which the link speed is set is transmitted from the access point 100 to the information processing apparatus 200 and thereby the link speed of the wireless LAN between the access point 100 and the information processing apparatus 200 is controlled.

Note that, as the frame data structure, various variation examples may be used depending on network operation mode. For example, there is also a case in which information other than the information described in the present embodiment is added. On the other hand, sometimes a part of the information described in the present embodiment is omitted.

FIG. 7 is a block diagram illustrating a configuration of the access point of the second embodiment. On the basis of control information included in the transmitted and received data such as QoS, the access point 100 of the present embodiment changes the communication speed at which the frame is transmitted according to the data flow priority indicated by a frame into which the data is divided. The access point 100 includes an input unit 121, a priority determination unit 122, a speed control unit 123, an output unit 124, a priority conversion unit 125, a priority-conversion-information storage unit 151, and a speed-determination-information storage unit 152. Further, the output unit 124 is connected with an antenna 114.

The access point 100 of the present embodiment performs transmission and reception by dividing data into plural frames. The frame into which the data is divided includes the control information to be used for data transfer. The control information includes priority information indicating a priority order in the wireless LAN data communication and destination address information indicating a destination MAC address of the frame.

The input unit 121 is connectable with another apparatus having a communication function such as a wireless communication apparatus and an information processing apparatus by a physical link of the wired LAN, the wireless LAN or the like, for example. The input unit 121 inputs data transmitted from such an apparatus as an input frame in the frame format.

The priority determination unit 122 determines the priority of the data flow input by the input unit 121 in the frame format. The priority determination unit 122 determines the data flow priority according to the information indicating whether or not the data is required to be transmitted at high speed, such as Priority and Destination MAC Address which are indicated by the wireless LAN control signal included in the frame control information. Further, when the format of the data priority input into the access point 100 is different from the format of the wireless LAN priority used in the determination, the priority determination unit 122 determines the wireless communication priority converted by the priority conversion unit 125 for the data flow.

Further, the priority determination unit 122 determines the data flow priority to be high regardless of a priority value when the destination MAC address included in the frame control information of the data input from the input unit 121 indicates a predetermined address such as a transmission destination MAC address. On the other hand, when the destination MAC address included in the frame control information of the data input from the input unit 121 is not a predetermined address, the priority determination unit 122 determines the data flow priority to be low. Thereby, it is possible to make the priority high and to secure a high speed communication when communicating with a predetermined apparatus.

The speed control unit 123 sets a communication speed of the wireless communication of the data to be output from the output unit 124 according to the data flow priority determined by the priority determination unit 122, based on the speed determination information stored in the speed-determination-information storage unit 152. Thereby, it is possible to perform data transmission and reception at a communication speed according to the determined priority.

Specifically, the speed control unit 123 sets a communication standard having a high communication speed (e.g., IEEE 802.11n) of the data to be output from the output unit 124 when the data flow priority is determined to be high by the priority determination unit 122. On the other hand, when the data flow priority is determined to be low by the priority determination unit 122, the speed control unit 123 sets a communication standard having a low communication speed (e.g., IEEE 802.11b or IEEE 802.11g) of the data to be output from the output unit 124.

When the input of the data flow in which QoS is set is not detected for a predetermined time (e.g., several minutes) or longer, the speed control unit 123 sets the communication speed of the wireless communication of the data to be output from the output unit 124 to be lower than the communication speed when the input of the data in which QoS is set is detected. Accordingly, it is possible to realize power saving by setting the link speed to a lower speed when data communication does not exist.

The output unit 124 outputs the data as an output frame in the frame format at the set communication speed. The data output from the output unit 124 is transferred to another apparatus such as the information processing apparatus 200 via the antennas 114 and 200$a$ through a wireless communication physical link such as the wireless LAN, for example. At this time, the output unit 124 performs negotiation by the transmission and reception of the control signal such as Beacon which controls link establishment between the wireless LAN interface unit 110 and the information processing apparatus 200 of a data transmission destination, and changes the communication speed of the established link to a communication speed according to the priority determination result by the priority determination unit 122.

The priority conversion unit 125 converts the priority of the data flow input from the input unit 121 into the wireless communication priority according to priority conversion information stored in the priority-conversion-information storage unit 151, when data to which a priority different in a format from the wireless LAN priority format is set is input from the input unit 121, as in a case in which the priority format of the data input from the input unit 121 is different from the wireless LAN priority format used for the determination.

The priority-conversion-information storage unit 151 stores the priority conversion information which converts the priority different in a format from the wireless LAN priority such as the wired LAN frame data priority into the wireless LAN frame data priority. Details of the priority conversion information will be described below in FIG. 11.

The speed-determination-information storage unit 152 stores the speed determination information indicating correspondence relationship between the priority of the data flow input from the input unit 121 and the communication speed of the wireless communication. Details of the speed determination information will be described below in FIG. 12.

Note that, while, in the present embodiment, the priority is determined according to the control information of the frame input from the input unit 121, not limited to this case, the priority may be determined according to the control information of the frame to be output from the output unit 124.

FIG. 8 illustrates an outline of an access point of the second embodiment. In an access point 100 described previously in FIG. 2, as illustrated in FIG. 8, for a wired LAN side input frame input from the wired LAN interface unit 107, the priority conversion unit 125 converts the wired LAN frame priority into the wireless LAN frame priority and the wireless LAN interface unit 110 outputs it as a wireless LAN side output frame. Thereby, the frame input into the access point 100 from the wired LAN side is relayed toward a destination on the wireless LAN side. At this time, the wired LAN frame priority is converted into the wireless LAN frame priority, and thereby the wireless LAN link speed may be controlled according to the wired LAN priority. Further, while a frame input into the access point 100 from the wireless LAN side is relayed toward a destination on the wired LAN side, explanation will be omitted.

FIG. 9 is a block diagram illustrating a configuration of the wired LAN interface unit of the second embodiment. The wired LAN interface unit 107 includes a flow detection unit 107$a$, a band monitoring unit 107$b$, a marker unit 107$c$, a priority designation unit 107$d$.

The flow detection unit 107a, when a flow which is a series of flow of the wired LAN side input frames input into the access point 100 of the present embodiment is input, detects the input flow based on the frame control information.

The band monitoring unit 107b monitors the band of the flow input into the wired LAN interface unit 107.

The marker unit 107c rewrites the priority of the detected flow. Thereby, it is possible to change the setting of the data flow priority as needed. In the access point 100 of the present embodiment, Priority (described previously in FIG. 5) is rewritten. Note that, not limited to this case, when the access point 100 has a Layer 3 switch function and a packet is input, Priority included in ToS Field of the packet in the input flow may be rewritten. Note that DSCP (DiffServ Code Point) may be used for indicating Priority of the packet.

The priority designation unit 107d decides flow output priority and queuing priority for storage in a queue.

After that, as described previously in FIG. 8, for the wired LAN side input frame input into the access point 100, the priority conversion unit 125 converts the wired LAN priority into the wireless LAN priority.

Note that the case that data flow is input from the wireless LAN interface unit 110 is similar to the above case and explanation will be omitted.

FIG. 10 is a block diagram illustrating a configuration of the wireless LAN interface unit of the second embodiment. As described previously in FIG. 8, the wireless LAN interface unit 110 outputs the flow, in which the wired LAN priority is converted into the wireless LAN priority by the priority conversion unit 125, to another wireless communication apparatus or an information processing apparatus which is connected with the access point 100, at a link speed according to the converted priority. The wireless LAN interface unit 110 includes a flow detection unit 110a, a band monitoring unit 110b, a marker unit 110c, a priority designation unit 110d, a priority detection unit 110e, a link confirmation unit 110f, a link control unit 110h, a discard control unit 110k, a shaper unit 110m, and an output queue unit 110p.

The flow detection unit 110a detects the flow, the priority of which is converted by the priority conversion unit 125, based on the frame control information.

The band monitoring unit 110b monitors the band of the flow output from the wireless LAN interface unit 110.

The marker unit 110c rewrites the priority of the detected flow as needed.

The priority designation unit 110d decides flow output priority and queuing priority for storage in a queue.

The priority detection unit 110e detects the priority which is indicated by the frame, decided in the priority designation unit 110d, and converted by the priority conversion unit 125, and controls the link control unit 110h.

The link confirmation unit 110f confirms a link state such as a link speed to the information processing apparatus 200 connected to the wireless LAN interface unit 110 and maintains link state data which indicates the previous link state.

The link control unit 110h changes the wireless LAN link communication speed at which the data is transmitted, according to the priority detection result by the priority detection unit 110e and the current link speed confirmed by the link confirmation unit 110f. The communication speed of the wireless LAN frame output from the wireless LAN interface unit 110 is controlled according to the control by the link control unit 110h.

The discard control unit 110k controls whether the frame is to be queued or discarded. The shaper unit 110m controls a frame output sequence and an output band. The output queue unit 110p preserves output-waiting data temporarily. The pre-served output-waiting data is read out according to a certain rule and the read-out data is output after that.

FIG. 11 illustrates a priority conversion table of the second embodiment. The priority conversion table 151a illustrated in FIG. 11 is stored in the priority-conversion-information storage unit 151. The priority conversion table 151a is a table storing priority conversion information which sets correspondence relationship between the wired LAN frame priority input into the access point 100 and the wireless LAN frame priority used for the link speed control in the access point 100.

The priority conversion table 151a is provided with the items of "LAN Priority" and "Wireless LAN Priority". In the priority conversion table 151a, information sets arranged laterally in each of the items are associated with each other as the priority conversion information.

LAN Priority indicates the priority set for the frame input from the wired LAN. In the present embodiment, LAN Priority is set according to the user priority of IEEE 802.1P. The numerical value in the parenthesis of LAN Priority indicates priority value to be set for the wired LAN frame. The priority of the frame input from the wired LAN is detected according to this set value.

Wireless LAN Priority indicates the wireless LAN priority set by conversion for the frame input from the wireless LAN and the frame input from the wired LAN. In the present embodiment, Wireless LAN Priority is set according to the access category of IEEE 802.11e. The numerical value in the parenthesis of Wireless LAN Priority indicates an access category value to be set for the wireless LAN frame. The priority for the wireless LAN frame is indicated according to this set value.

In the priority conversion table 151a, LAN Priority and Wireless LAN Priority are associated with each other. When the frame for which LAN Priority is set is input from the wired LAN, the priority conversion unit 125 converts the priority of the input frame into Wireless LAN Priority associated in the priority conversion table 151a. Further, LAN Priority is assumed to be lowest for (1) Background and highest in (7) Network Control. Further, Wireless LAN Priority is assumed to be lowest in (1) AC_BK and highest in (4) AC_VO.

In the priority conversion table 151a, (1) Background and (2) Spare of LAN Priority are associated with (1) AC_BK of Wireless LAN Priority. For example, when a frame of (1) Background or a frame of (2) Spare is input from the wired LAN, the priority of the input frame is converted into (1) AC_BK of Wireless LAN Priority.

Similarly, in the priority conversion table 151a, (0) Best Effort and (3) Excellent Effort of LAN Priority are associated with (2) AC_BE of Wireless LAN Priority. Further, (4) Controlled Load and (5) Video of LAN Priority are associated with (3) AC_VI of Wireless LAN Priority. Moreover, (6) Voice and (7) Network Control of LAN Priority are associated with (4) AC_VO of Wireless LAN Priority.

Note that, while an example of the priority conversion information which converts the priority of IEEE 802.1P into the priority of IEEE 802.11e is illustrated in FIG. 11, similar priority conversion information may be set and the priority may be converted by the priority conversion unit 125, also when the priority having another format is converted into the priority used for the determination in the access point 100, as in the case that packet priority is converted into the priority of IEEE 802.11e.

Figure 12:
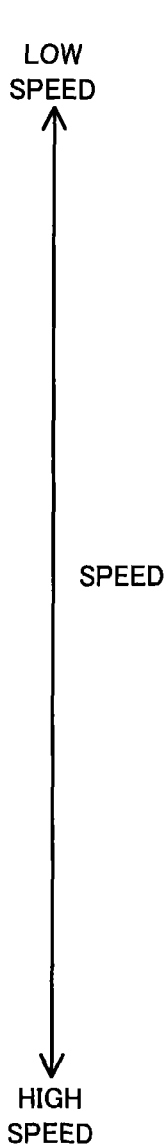
FIG. 12 illustrates a speed determination table of the second embodiment.

FIG. 12 illustrates a speed determination table of the second embodiment. The speed determination table 152a illustrated in FIG. 12 is stored in the speed-determination-information storage unit 152. The speed determination table 152a is a table storing the speed determination information which sets correspondence relationship between the wireless LAN priority and the wireless LAN link speed in the access point 100.

The speed determination table 152*a* is provided with the items of "Wireless LAN Priority" and "Link Speed". In the speed determination table 152*a*, information sets arranged laterally in each of the items are associated with each other as the speed determination information.

Wireless LAN Priority indicates the priority of the frame input into the access point 100. That is, Wireless LAN Priority indicates the priority of the frame input from the wireless LAN or indicates the wireless LAN priority into which the priority of the frame input from the wired LAN is converted by the priority conversion unit 125 according to the priority conversion table 151*a*.

Link Speed indicates usage standards to be used for communication by the wireless LAN in the access point 100. In the present embodiment, the access point 100 is assumed to be capable of using plural wireless LAN usage standards, and the wireless LAN link speeds are assumed to correspond to the respective usage standards. That is, the access point 100 of the present embodiment controls the wireless LAN link speed by changing the wireless LAN usage standard.

In the speed determination table 152*a*, the wireless LAN priority and the link speed are associated with each other. When a wired LAN frame is input into the access point 100 from the wired LAN and the priority of the wired LAN frame is converted into the wireless LAN priority, or when a wireless LAN frame is input into the access point 100 from the wireless LAN, the speed control unit 123 determines the wireless LAN link speed which is associated with the converted wireless LAN priority of the input frame in the speed determination table 152*a*. Further, the wireless LAN link speed is assumed to be lowest in IEEE 802.11b and highest in IEEE 802.11n.

In the speed determination table 152*a*, (1) AC_BK and (2) AC_BE of Wireless LAN Priority are associated with IEEE 802.11g of Link Speed. For example, when a frame having the wireless LAN priority of (1) AC_BK or a frame the wireless LAN priority of (2) AC_BE is input, IEEE 802.11g is determined as the wireless link speed.

Similarly, in the speed determination table 152*a*, (3) AC_VI and (4) AC_VO of Wireless LAN Priority are associated with IEEE 802.11n of Link Speed. Further, when communication of the QoS data frame does not exist for a predetermined time (e.g., several minutes) or longer, IEEE 802.11b having the lowest speed is determined as the wireless LAN link speed.

Figure 13:
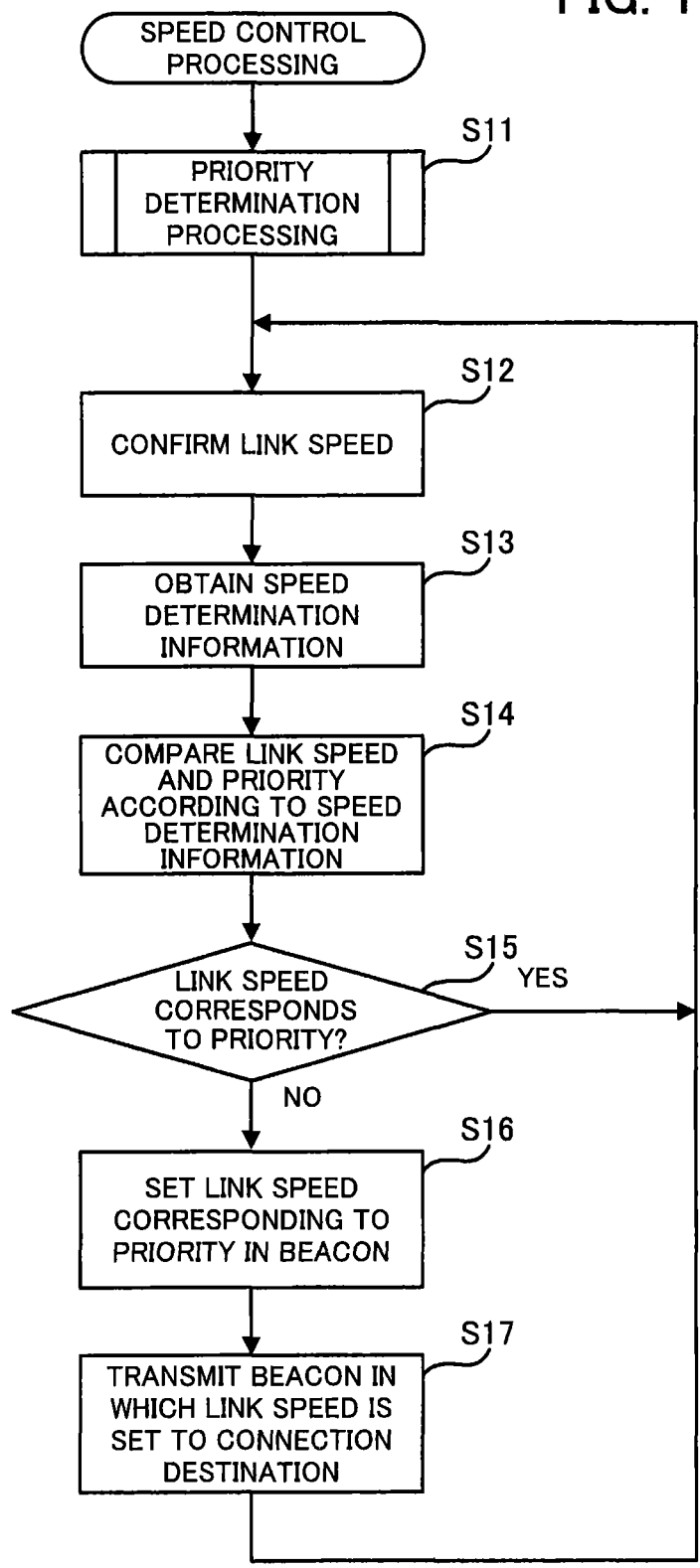
FIG. 13 is a flowchart illustrating a procedure of speed control processing of the second embodiment.

FIG. 13 is a flowchart illustrating a procedure of the speed control processing of the second embodiment. The speed control processing illustrated in FIG. 13 is processing of controlling link speed according to the data flow priority in the access point 100. The speed control processing of the present embodiment is executed in response to communication start by the access point 100.

[Step S11] The priority determination unit 122 executes priority determination processing (to be described below in FIG. 14).

[Step S12] The speed control unit 123 confirms the link speed used in the wireless LAN.

[Step S13] The speed control unit 123 obtains the speed determination information stored in the speed-determination-information storage unit 152

[Step S14] The speed control unit 123 performs comparison of the frame priority determined in Step S11 and the link speed confirmed in Step S12 according to the speed determination information obtained in Step S13. At this time, since the speed control unit 123 does not detect the frame priority when a frame having the QoS data is not detected for a predetermined time or longer, the speed control unit 123 sets the priority to be lower than the priority when a frame having the QoS data has been detected and compares with the link speed.

[Step S15] The speed control unit 123 determines whether the frame priority and the link speed, which have been compared in Step S14, correspond to each other or not. When the frame priority and the link speed correspond to each other (YES in Step S15), the process proceeds to Step S12. On the other hand, when the frame priority and the link speed do not correspond to each other (NO in Step S15), the process proceeds to Step S16.

[Step S16] The speed control unit 123 sets a link speed corresponding to the priority determined in Step S11 in Beacon.

[Step S17] The speed control unit 123 transmits Beacon in which the link speed is set in Step S16 to the information processing apparatus 200 of a connection destination. Thereby, communication by the link wireless LAN having the speed corresponding to the priority determined in Step S11 is performed with the information processing apparatus 200.

Note that, while, in the speed control processing of the present embodiment, the speed determination information is obtained in Step S13 after the link speed has been confirmed in Step S12, not limited to this case, the link speed may be confirmed after the speed determination information has been obtained.

Figure 14:
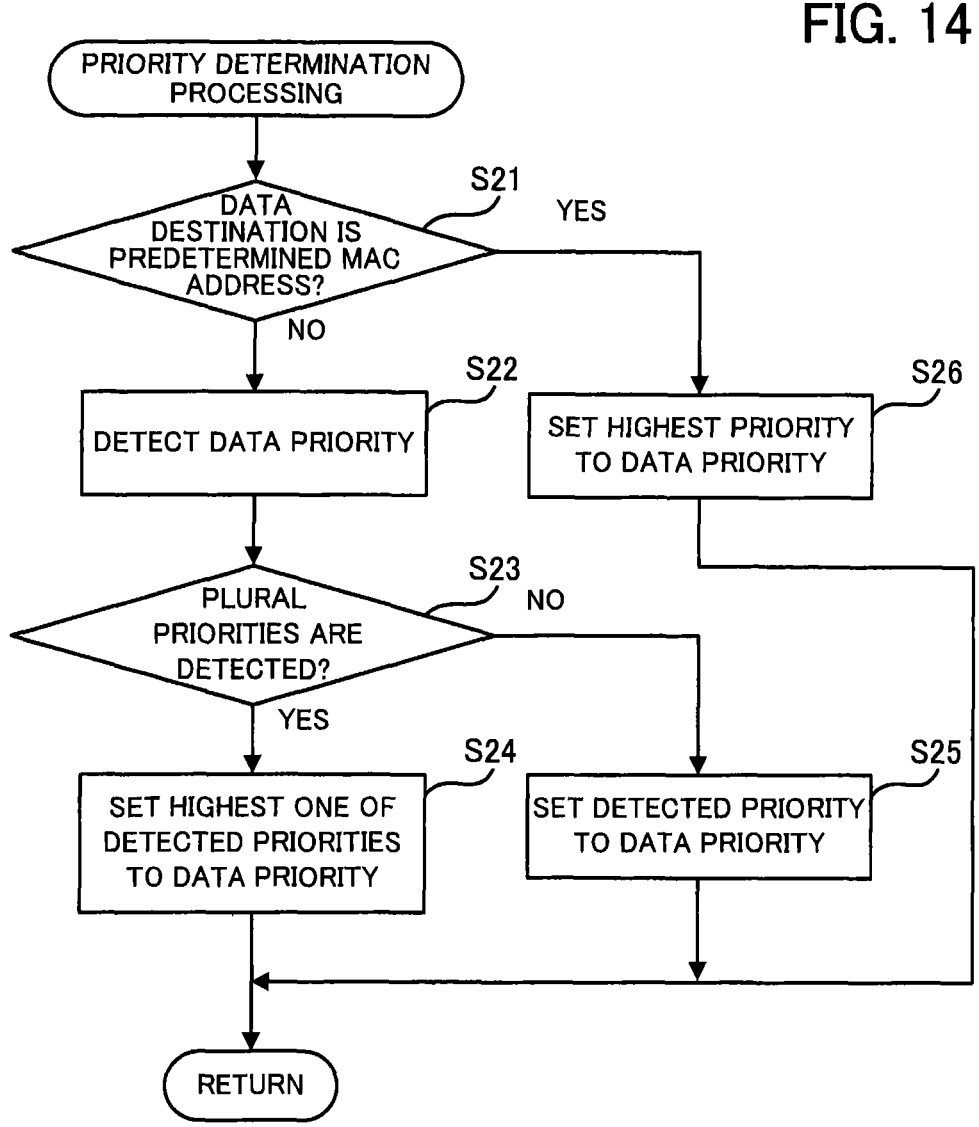
FIG. 14 is a flowchart illustrating a procedure of priority determination processing of the second embodiment.

FIG. 14 is a flowchart illustrating a procedure of the priority determination processing of the second embodiment. The priority determination processing illustrated in FIG. 14 is processing of determining the data priority based on the frame input into the access point 100. The priority determination processing of the present embodiment is executed after having been invoked in Step S11 of the speed control processing.

[Step S21] The priority determination unit 122 determines whether the destination MAC address indicated by the control information of the frame input into the access point 100 is a predetermined MAC address or not. When the destination MAC address is the predetermined MAC address (YES in Step S21), the process proceeds to S26. On the other hand, when the destination MAC address is not the predetermined MAC address (NO in Step S21), the process proceeds to Step S22.

[Step S22] The priority determination unit 122 detects the priority of the frame input into the access point 100. At this time, when the frame input into the access point 100 is input from the wireless LAN, frame priority set by a transmission source is detected. On the other hand, when the frame input into the access point 100 is input from the wired LAN, the frame priority converted into the wireless LAN priority in the priority conversion unit 125 is detected.

[Step S23] The priority determination unit 122 determines whether plural kinds are detected or not in Step S22 for the priority of the data frame input into the access point 100. When plural kinds of priority are detected (YES in Step S23), the process proceeds to Step S24. On the other hand, when only one kind of priority is detected (NO in Step S23), the process proceeds to Step S25.

[Step S24] The priority determination unit 122 sets the highest one of the kinds of priority to the priority of the data frame. After that, the process returns.

[Step S25] The priority determination unit 122 sets the priority detected in Step S22 to the priority of the data frame. After that, the process returns.

[Step S26] The priority determination unit 122 sets the highest priority (e.g., Access Category AC_VO) to the priority of the data frame. After that, the process returns.

Note that, while, in the priority determination processing of the present embodiment, it is determined in Step S23 whether plural kinds of priority are obtained or not after it has been determined in Step S21 whether the destination of the data is the predetermined MAC address or not, not limited to this case, it may be determined whether the destination of the data is the predetermined MAC address or not after it has been determined whether the plural kinds of priority are obtained or not.

Figure 15:
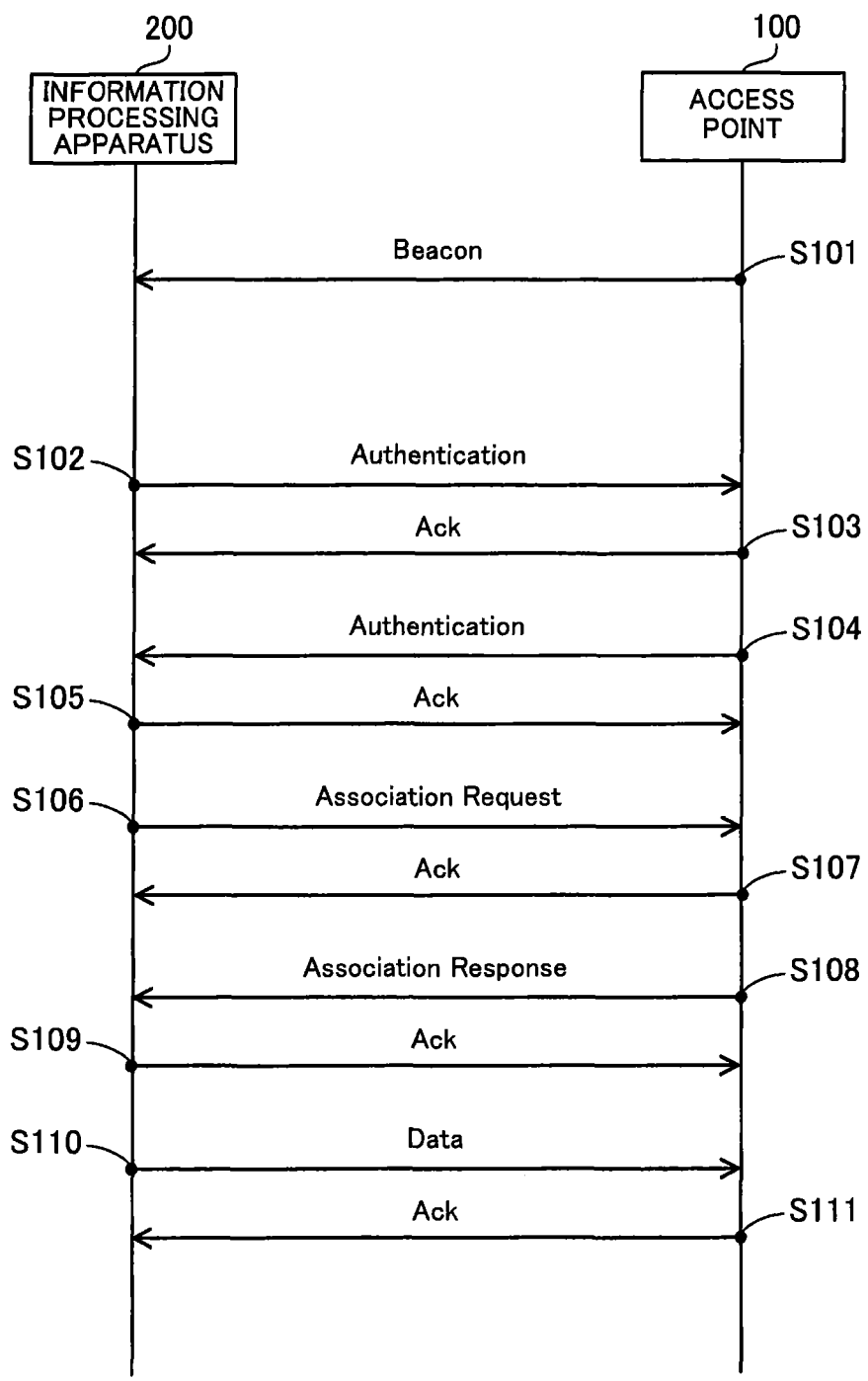
FIG. 15 is a sequence chart illustrating a procedure of link connection of the second embodiment.

FIG. 15 is a sequence chart illustrating a procedure of link connection of the second embodiment.

In the present embodiment, when link connection is started or the link speed is changed, the access point 100 transmits Beacon by the passive scanning. At this time, the access point 100 performs the transmission by setting a link speed according to the frame priority in Beacon to be transmitted. The information processing apparatus 200, which is a connection destination receiving this transmission, performs the setting of wireless LAN communication at the link speed set in the received Beacon. Thereby, a wireless LAN link is established at the speed according to the frame priority between the access point 100 and the information processing apparatus 200. In the following, according to FIG. 15, the procedure up to the establishment of the wireless LAN link between the access point 100 and the information processing apparatus 200 will be explained.

[Step S101] The access point 100 transmits Beacon in which a link speed corresponding to the frame priority is set, to the information processing apparatus 200. Thereby, the link speed corresponding to the frame priority is notified to the information processing apparatus 200.

[Step S102] The information processing apparatus 200, when having received Beacon transmitted from the access point 100 in Step S101, transmits Authentication to the access point 100.

[Step S103] The access point 100, when having received Authentication transmitted from the information processing apparatus 200 in Step S102, transmits Ack (Acknowledgment) for Authentication to the information processing apparatus 200.

[Step S104] The access point 100 transmits Authentication to the information processing apparatus 200.

[Step S105] The information processing apparatus 200, when having received Authentication transmitted from the access point 100 in Step S104, transmits Ack for the Authentication to the access point 100.

[Step S106] The information processing apparatus 200 transmits Association Request to the access point 100.

[Step S107] The access point 100, when having received Association Request transmitted from the information processing apparatus 200 in Step S106, transmits Ack for Association Request to the information processing apparatus 200.

[Step S108] The access point 100 transmits Association Response to the information processing apparatus 200.

[Step S109] The information processing apparatus 200, when having received Association Response transmitted from the access point 100 in Step S108, transmits Ack for Association Response to the access point 100. Thereby, wireless LAN communication is established at the link speed corresponding to the frame priority between the access point 100 and the information processing apparatus 200.

[Step S110] The information processing apparatus 200 transmits Data to the access point 100.

[Step S111] The access point 100, when having received Data transmitted from the information processing apparatus 200 in Step S110, transmits Ack for Data to the information processing apparatus 200.

As described previously, according to the second embodiment, the link speed is changed according to the priority which is determined according to the priority included in the frame control information and the destination MAC address, and therefore it is possible to suppress the communication speed of the data having a lower priority and it is possible to reasonably reduce high speed communication with a large amount of power consumption and to reduce power consumption of the access point 100.

[Third Embodiment]

Next, a third embodiment will be explained. The explanation will be provided centering on a different point from the above second embodiment, and like items are denoted by the same sign and explanation will be omitted.

In the third embodiment, there will be explained a case of determining the wireless LAN link speed according to packet priority in a network layer where data is relayed based on an IP address. Further, in the third embodiment, a data unit of Layer 3 in the OSI reference model is expressed as a packet in a unified manner for all the cases, for convenience of explanation.

Note that, while the case of transferring a TCP packet according to the TCP (Transmission Control Protocol) protocol will be explained in the present embodiment, not limited to this case, also a UDP packet according to the UDP (User Datagram Protocol) protocol and a packet according to another protocol may be transferred in the same manner.

Figure 16:
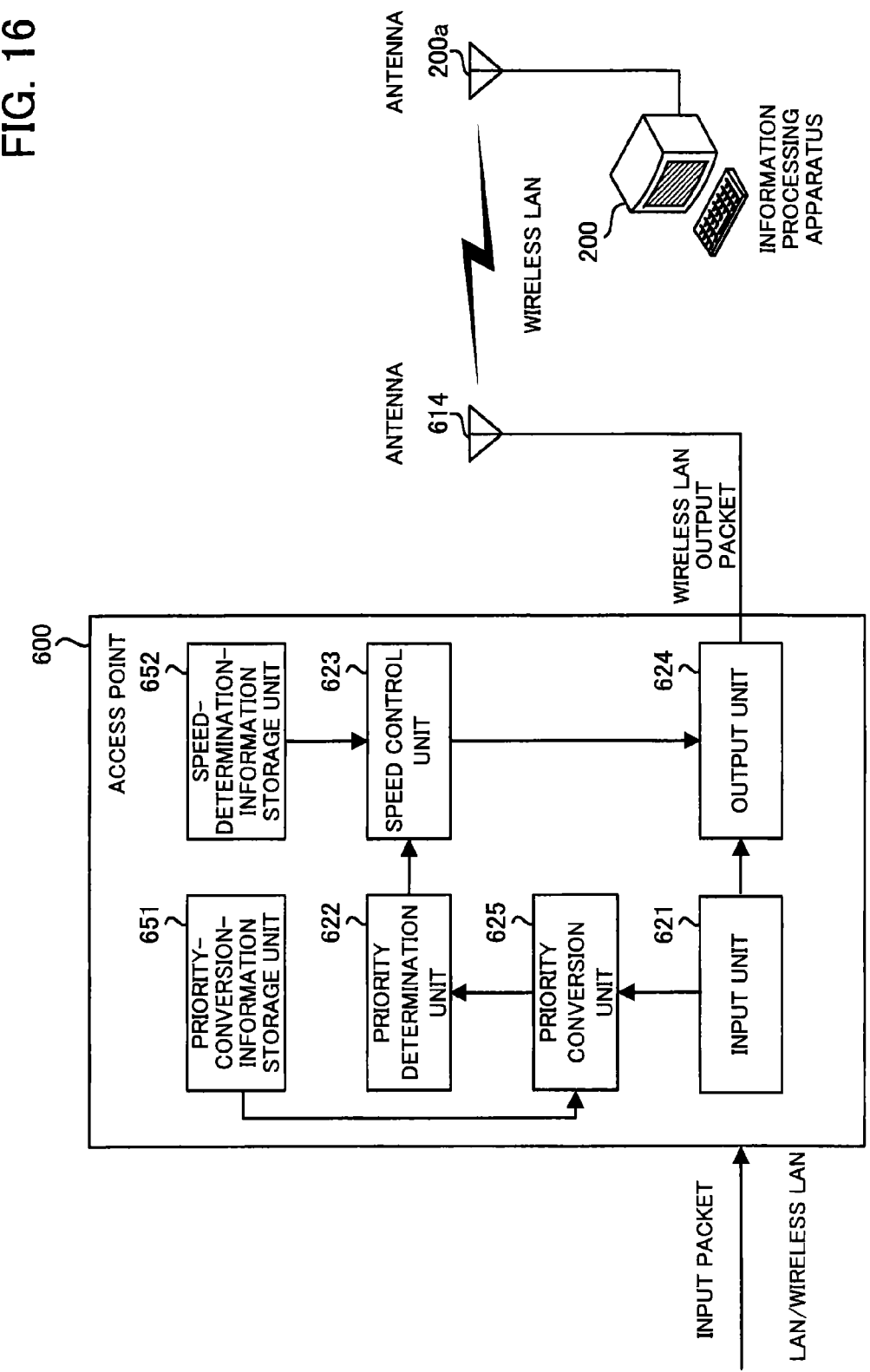
FIG. 16 is a block diagram illustrating a configuration of an access point of a third embodiment.

FIG. 16 is a block diagram illustrating a configuration of an access point of the third embodiment. An access point 600 illustrated in FIG. 16 in the present embodiment may be used in connection with an information processing apparatus in a system similar to the system of FIG. 2.

The access point 600 of the present embodiment, on the basis of control information such as QoS included in transmission and reception data, changes communication speed of packet transmission according to data flow priority indicated by a packet into which the data is divided. The access point 600 includes an input unit 621, a priority determination unit 622, a speed control unit 623, an output unit 624, a priority conversion unit 625, priority-conversion-information storage unit 651, and a speed-determination-information storage unit 652. Further, the output unit 624 is connected with an antenna 614.

The access point 600 of the present embodiment performs transmission and reception by dividing the data into plural packets. The packet into which the data is divided includes the control information to be used for data transfer. The control information includes priority information indicating a priority order in data communication and a destination IP address indicating an address of a data transmission destination.

The input unit 621 is connectable with another apparatus having a communication function such as a wireless communication apparatus and an information processing apparatus by a physical link such as the wired LAN and the wireless LAN, for example. The input unit 621 inputs data transmitted from such an apparatus as an input packet in a packet format.

The priority determination unit 622 determines priority of the data flow input by the input unit 621 in the packet format. The priority determination unit 622 determines the data flow priority according to information indicating whether the data is to be transmitted at high speed or not, such as Priority included in ToS Field, Destination IP Address, port number information indicating a port number of a packet transmission destination, which are indicated by the control information included in information of a packet header. Further, in the present embodiment, since the format of the data priority input from the input unit 621 is a format of the packet priority and different from a format of the wireless LAN priority used for the determination, the priority determination unit 622 determines the data flow wireless communication priority converted by the priority conversion unit 625.

Further, the priority determination unit 622 determines the data flow priority to be high regardless of a priority value when the destination IP address included in the control information of a data packet input from the input unit 621 indicates a predetermined address. On the other hand, the priority determination unit 622 determines the data flow priority to be low when the destination IP address included in the control information of the data packet input from the input unit 621 is not the predetermined address.

Here, the IP address indicates an information processing apparatus of a counterpart under communication. That is, in the present embodiment, the priority may be determined depending on each information processing apparatus of a communication counterpart.

Further, the priority determination unit 622 determines the data flow priority to be high regardless of the priority value when the transmission destination port number information included in the control information of the data packet input from the input unit 621 indicates a predetermined port number. On the other hand, the priority determination unit 622 determines the data flow priority to be low when the transmission destination port number information included in the control information of the data packet input from the input unit 621 is not the predetermined port number.

Here, the TCP or UDP port number is operated in the information processing apparatus of the counterpart under communication and indicates an application and a service for processing the transmission and reception data. That is, in the present embodiment, the priority may be determined depending on the application and the service for processing the transmission and reception data.

For example, when the communication speed of data transmitted by FTP (File Transfer Protocol) is emphasized, FTP port numbers "20" and "21" are set preliminarily as predetermined port numbers. Thereby, the priority determination result becomes high for the FTP packet. Accordingly, it is possible to maintain the communication speed of a transmission link for the data. On the other hand, when the communication speed of the data transmitted by FTP is not emphasized and power saving is prioritized, the priority is made low for the packet having the port number "20", and thereby the link communication speed becomes low and power saving is realized.

In this manner, it becomes possible to set the priority minutely and appropriately depending on data use by specifying the data processing application from the port number of the packet.

Further, it is possible to determine the data flow priority by the combination of the above information processing apparatus of the transmission destination and the application and the service for processing the data.

The speed control unit 623 sets a communication speed of the wireless communication of data to be output from the output unit 624 according to the data flow priority determined by the priority determination unit 622 based on speed determination information stored in the speed-determination-information storage unit 652. Thereby, it is possible to perform data transmission and reception at a communication speed according to the determined priority.

When the input of the data flow in which QoS is set is not detected for a predetermined time (e.g., several minutes) or longer, the speed control unit 623 sets the communication speed of the wireless communication of the data to be output from the output unit 624 to be lower than the communication speed when the input of the data in which QoS is set is detected. Accordingly, it is possible to realize power saving by setting the link speed to be low when data communication does not exist.

The output unit 624 outputs the data as an output packet in the packet format at the set communication speed. The data output from the output unit 624 is transferred to another apparatus such as the information processing apparatus 200 via the antennas 614 and 200a through a wireless communication physical link such as the wireless LAN, for example. At this time, the output unit 624 performs negotiation by the transmission and reception of the control signal such as Beacon for controlling link establishment between a wireless LAN interface unit which is not illustrated and the information processing apparatus 200 which is a data transmission destination, and changes the established link communication speed to a communication speed according to the priority determination result by the priority determination unit 622.

Since the priority format of the data input from the input unit 621 is the packet priority format and different from the wireless LAN priority format used for the determination, the priority conversion unit 625 converts the priority of the data flow input by the input unit 621 into the wireless communication priority according to priority conversion information stored in the priority-conversion-information storage unit 651.

The priority-conversion-information storage unit 651 stores the priority conversion information which converts the priority different in a format from the wireless LAN priority such as the priority of the packet data into the priority of the wireless LAN packet data.

The speed-determination-information storage unit 652 stores speed determination information indicating correspondence relationship between the priority of the data flow input from the input unit 621 and the communication speed of the wireless communication.

Note that, while, in the present embodiment, the priority is determined according to the control information of the packet input from the input unit 621, not limited to this case, the priority may be determined according to the control information of a packet to be output from the output unit 624.

Figure 17:
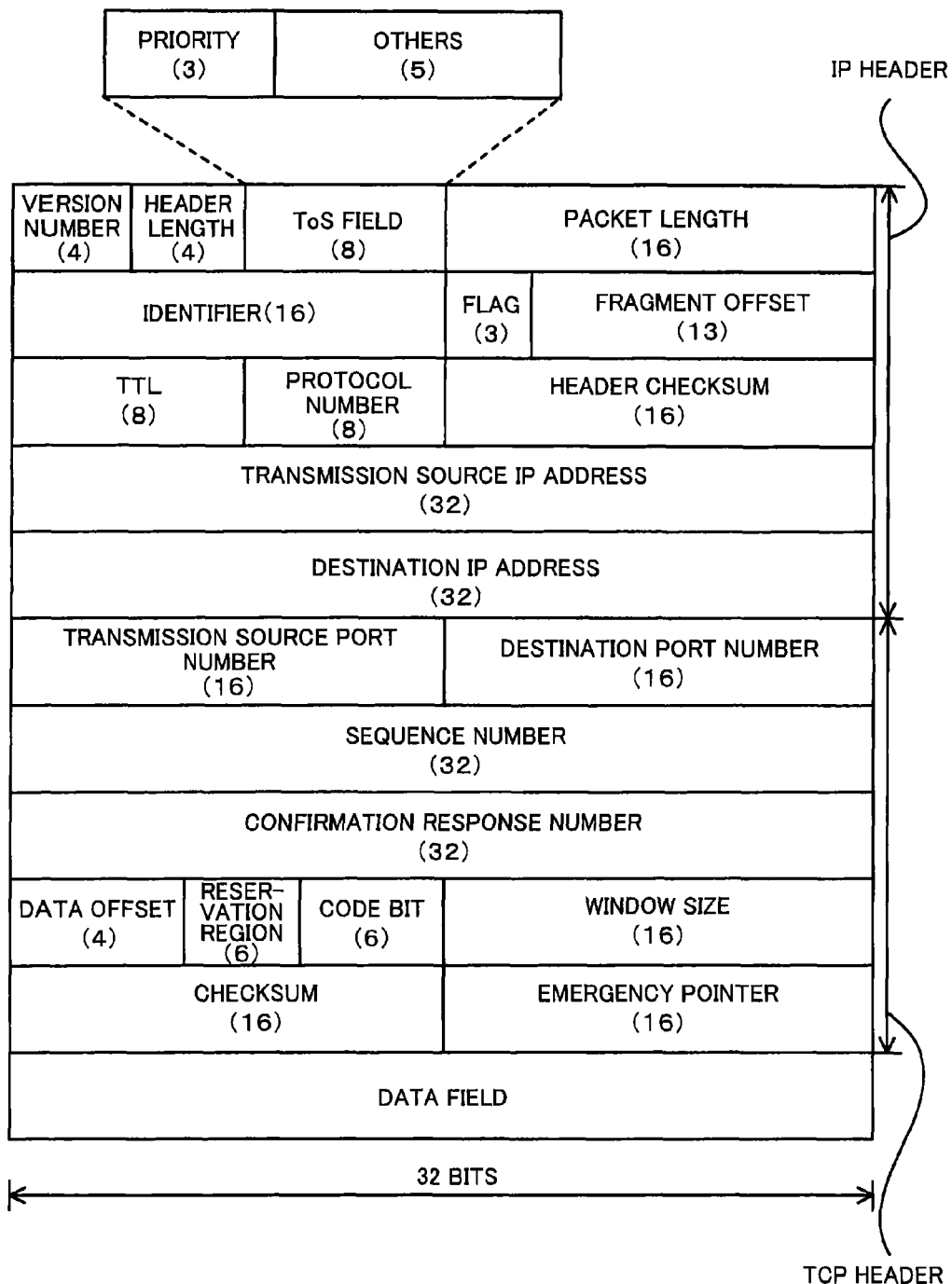
FIG. 17 illustrates a data structure example in a packet of the third embodiment.

FIG. 17 illustrates a data structure example of the packet of the third embodiment. In the present embodiment, the packet illustrated in FIG. 17 is transmitted and received between the access point 100 and another communication apparatus such as an information processing apparatus or a relaying apparatus which is not illustrated in the drawing via an interface unit similar to the wired LAN interface unit 107 and the wireless LAN interface unit 110 of the second embodiment, which are described previously in FIG. 3, in the access point 100 described previously in FIG. 2.

The packet illustrated in FIG. 17 includes an IP header and a TCP header both including control information.

The IP header includes Version Number of a 4 bit region, Header Length of a 4-bit region, ToS Field of an 8-bit region, Packet Length of a 16-bit region, Identifier of a 16-bit region, Flag of a 3-bit region, Fragment Offset of a 13-bit region, TTL (Time To Live) of an 8-bit region, Protocol Number of an 8-bit region, Header Checksum of a 16-bit region, Transmission Source IP Address of a 32-bit region, and Destination IP Address of a 32-bit region. Further, ToS Field includes Priority of a 3-bit region and the other 5-bit region.

The TCP header includes Transmission Source Port Number of a 16-bit region, Destination Port Number of a 16-bit region, Sequence Number of a 32-bit region, Confirmation Response Number of a 32-bit region, Data Offset of a 4-bit region, Reservation Region of a 6-bit region, Code Bit of a 6-bit region, Window Size of a 16-bit region, Checksum of a 16-bit region, and Emergency Pointer of a 16-bit region.

Further, the packet includes Data Field together with these IP header and TCP header.

Here, Priority included in ToS Field indicates the priority of the packet data flow.

The access point 600 of the present embodiment determines the wireless LAN link speed according to the priority of the input packet. When the wireless LAN link speed is determined according to the packet priority, the access point 600 obtains the priority of the packet communicated by the wireless LAN according to Priority of the packet illustrated in FIG. 17. Next, the access point 600 determines the wireless LAN link speed according to the obtained packet priority.

Note that, as the packet data structure, various variation examples may be considered depending on a network operation mode and the like. For example, there is a case in which information other than the information illustrated in FIG. 17 is added. On the other hand, sometimes a part of the information illustrated in FIG. 17 is omitted.

Figure 18:
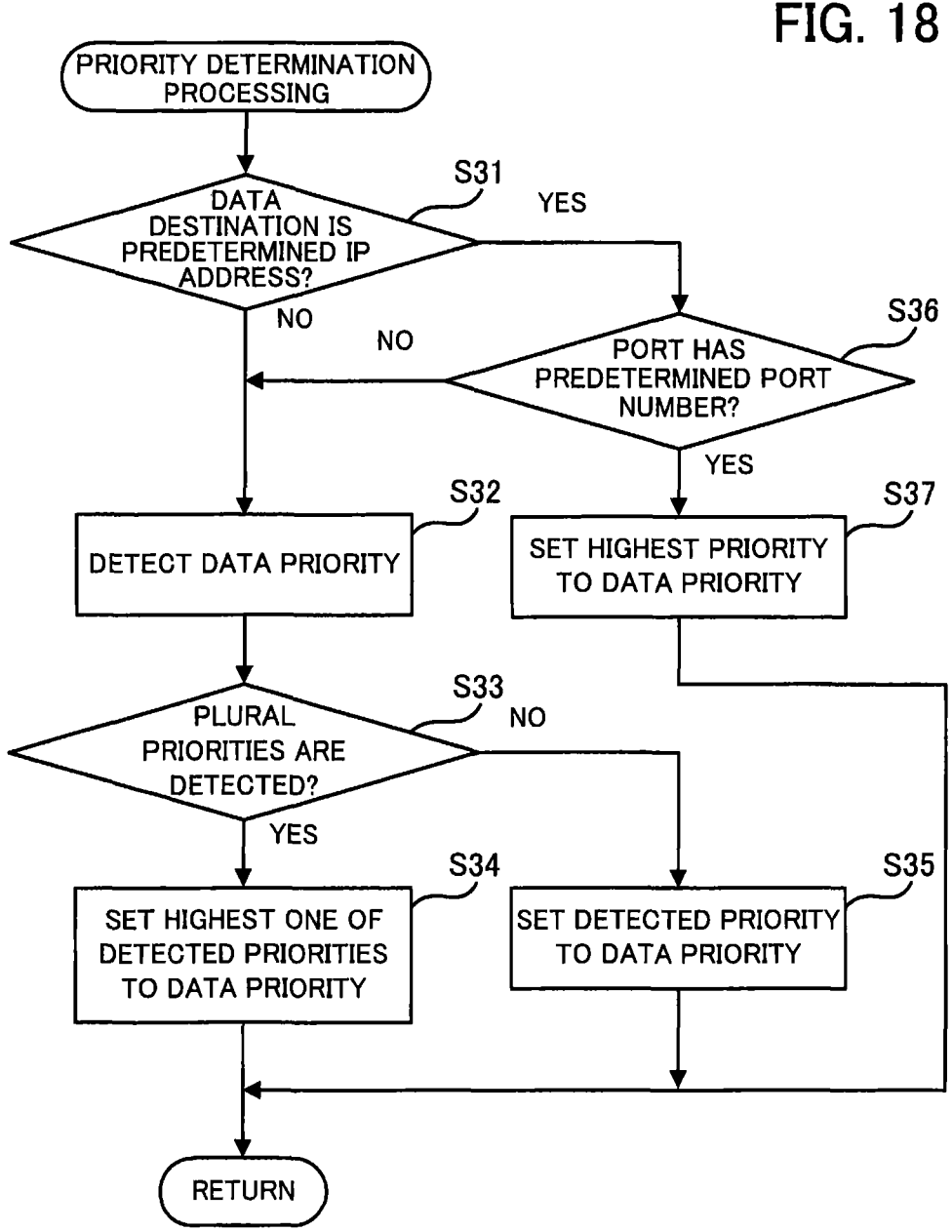
FIG. 18 is a flowchart illustrating a procedure of priority determination processing of the third embodiment.

FIG. 18 is a flowchart illustrating a procedure of priority determination processing of the third embodiment. The priority determination processing illustrated in FIG. 18 is processing of determining the data priority based on the packet input into the access point 600. The priority determination processing of the present embodiment is executed when invoked in Step S11 of the speed control processing.

[Step S31] The priority determination unit 622 determines whether the destination IP address indicated by the control information of the packet input into the access point 600 is a predetermined IP address or not. When the destination IP address is the predetermined IP address (YES in Step S31), the process proceeds to Step S36. On the other hand, when the destination IP address is not the predetermined IP address (NO in Step S31), the process proceeds to Step S32.

[Step S32] The priority determination unit 622 detects the priority of the data packet input into the access point 600. At this time, the wireless LAN packet priority converted in the priority conversion unit 625 is detected as the priority of the packet input into the access point 600.

[Step S33] The priority determination unit 622 determines whether plural kinds are detected or not for the priority of the data packet input into the access point 600 in Step S32. When the plural kinds of priority are detected (YES in Step S33), the process proceeds to Step S34. On the other hand, when only one kind of priority is detected (NO in Step S33), the process proceeds to Step S35.

[Step S34] The priority determination unit 622 sets the highest one of the plural kinds of priority detected in Step S32 to the priority of the data packet. After that, the process returns.

[Step S35] The priority determination unit 622 sets the priority detected in Step S32 to the priority of the data packet. After that, the process returns.

[Step S36] The priority determination unit 622 determines whether the transmission destination port number or the transmission source port number which is indicated by the packet control information is a predetermined port number (e.g., "20" or "21") or not. When either the transmission destination port number or the transmission source port number is the predetermined port number (YES in Step S36), the process proceeds to Step S37. On the other hand, when neither the transmission destination port number nor the transmission source port number is the predetermined port number (NO in Step S36), the process proceeds to Step S32.

[Step S37] The priority determination unit 622 sets the highest priority (e.g., Access category AC_VO) to the data packet priority. After that, the process returns.

Note that, while, in the priority determination processing of the present embodiment, it is determined in Step S33 whether the plural kinds of priority are obtained or not after it has been determined in Step S31 whether the destination of the data is the predetermined IP address or not, not limited to this case, it may be determined whether the destination of the data is the predetermined IP address or not after it has been determined whether the plural kinds of priority are obtained or not.

Further, while, in the priority determination processing of the present embodiment, it is determined in Step S36 whether the port used by the data has the predetermined port number or not after it has been determined in Step S31 whether the destination of the data is the predetermined IP address or not, not limited to this case, it may be determined whether the destination of the data is the predetermined IP address or not after it has been determines whether the port used by the data has the predetermined port number or not.

Further, while, in the priority determination processing of the present embodiment, it is determined in Step S33 whether the plural kinds of priority are obtained or not after it has been determined in Step S36 whether the port used by the data has the predetermined port number or not, not limited to this case, it may be determined whether the port used by the data has the predetermined port number or not after it has been determined whether the plural kinds of priority are obtained or not.

As described above, according to the third embodiment, also when the access point 600 transfers the IP packet, it is possible to provide the same effect as the effect of the second embodiment by using Priority in ToS Field included in the IP packet.

Further, since the priority is determined according to the port number to be used, it is possible to decide the priority depending on an application used in an information processing apparatus on the client side. Thereby, it is possible to cause the data to have a higher priority to be transmitted and received at high speed, for a packet in a flow which transmits and receives the data of an application which requires a higher link speed.

[Fourth Embodiment]

Next, a fourth embodiment will be explained. The explanation will be provided centering on a different point from the above second embodiment, and like items are denoted by the same sign and explanation will be omitted.

Figure 19:
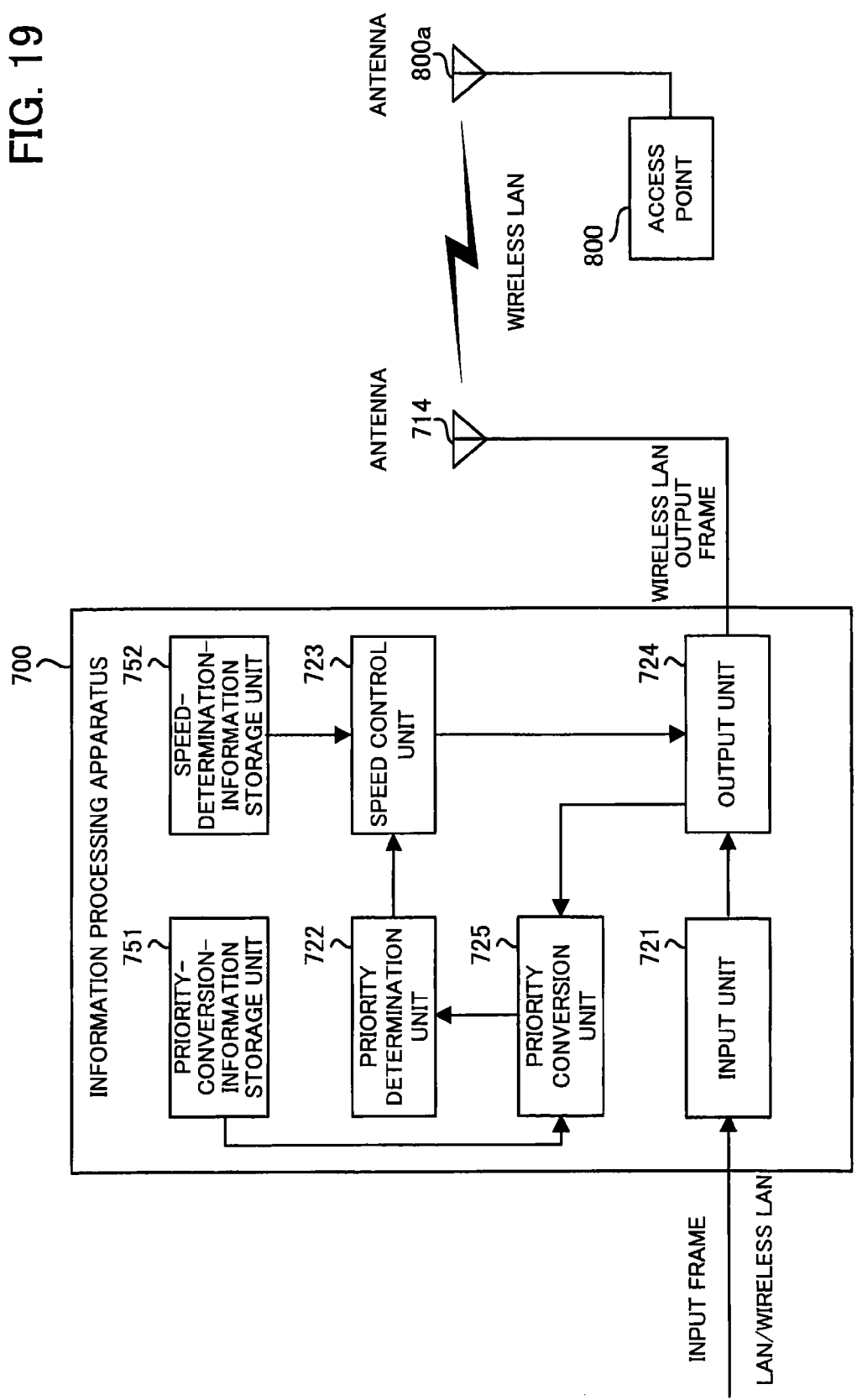
FIG. 19 is a block diagram illustrating a configuration of an information processing apparatus of a fourth embodiment.

FIG. 19 is a block diagram illustrating a configuration of an information processing apparatus of the fourth embodiment. An information processing apparatus 700 of the present embodiment illustrated in FIG. 19 is used in connection with an access point 800 in a system similar to the system illustrated in FIG. 2.

The information processing apparatus 700 of the present embodiment changes a communication speed at which a frame is transmitted, according to data flow priority indicated by the frame into which data is divided, based on control information, such as QoS, included in the data transmitted from or received by the information processing apparatus. The information processing apparatus 700 includes an input unit 721, a priority determination unit 722, a speed control unit 723, an output unit 724, a priority conversion unit 725, a priority-conversion-information storage unit 751, and a speed-determination-information storage unit 752. Further, the output unit 724 is connected with an antenna 714.

The information processing apparatus 700 of the present embodiment is capable of performing communication in a Layer 2 frame and performs transmission and reception by dividing the data into plural frames. The frame into which the data is divided includes the control information to be used for data transfer. The control information includes priority information indicating a priority order in data communication and destination address information indicating a destination MAC address of the frame.

The input unit 721 is connectable with another apparatus having a communication function such as a wireless communication apparatus and an information processing apparatus by a physical link such as the wired LAN and the wireless LAN, for example. The input unit 721 inputs data transmitted from such an apparatus as an input frame in the frame format.

The priority determination unit 722 determines the priority of the data flow to be output by the output unit 724 in the frame format. The priority determination unit 722 determines the data flow priority according to information indicating whether the data is required to be transmitted at high speed or not, such as Priority and Destination MAC Address which are indicated by a wireless LAN control signal included in the frame control information.

Further, when the priority format of the data to be output from the information processing apparatus 700 is different from the format of the wireless LAN priority used for the determination, the priority determination unit 622 determines the wireless communication priority of the data flow converted by the priority conversion unit 725.

Further, the priority determination unit 722 determines the data flow priority to be high when the destination MAC address included in the control information of the data frame to be output from the output unit 724 indicates a predetermined address such as the transmission destination MAC address. On the other hand, the priority determination unit 722 determines the data flow priority to be low when the destination MAC address included in the control information of the data frame to be output from the output unit 724 is not the predetermined address. Thereby, it is possible to make the priority higher and to secure higher speed communication when communicating with a predetermined apparatus.

The speed control unit 723 sets a communication speed of the data to be output from the output unit 624 according to the data flow priority determined by the priority determination unit 722 based on speed determination information stored in the speed-determination-information storage unit 752. Thereby, it is possible to perform data transmission and reception at a communication speed according to the determined priority.

When the output of the data flow in which QoS is set is not detected for a predetermined time (e.g., several minutes) or longer, the speed control unit 723 sets the communication speed of the wireless communication of the data to be output from the output unit 724 to be lower than the communication speed when the output of the data in which QoS is set is detected. Accordingly, it is possible to realize power saving by setting the link speed to be lower when data communication does not exist.

The output unit 724 outputs the data as an output frame in the frame format at the set communication speed. The data output from the output unit 724 is transferred to another apparatus such as the access point 800 via the antennas 714 and 800a through a wireless communication physical link such as the wireless LAN, for example. At this time, the output unit 724 performs negotiation by the transmission and reception of the control signal such as Probe Request which controls link establishment between a wireless LAN interface unit to be explained below in FIG. 20 and the access point 800 which is a data transmission destination, and changes the established link communication speed to a communication speed according to the priority determination result by the priority determination unit 722.

When the data in which the priority different in a format from the wireless LAN priority is set is output from the information processing apparatus 700, as in the case that the priority format of the data to be output from the output unit 724 is different from the wireless LAN priority format used for the determination, the priority conversion unit 725 converts the priority of the data flow output by the output unit 724 into the wireless communication priority according to priority conversion information stored in the priority-conversion-information storage unit 751.

The priority-conversion-information storage unit 751 stores the priority conversion information which converts the priority different in a format from the wireless LAN priority, such as the priority of wired LAN frame data, into the priority of the wireless LAN frame data.

The speed-determination-information storage unit 752 stores speed determination information indicating correspondence relationship between the priority of the data flow to be output from the output unit 724 and the communication speed of the wireless communication.

Note that, while, in the present embodiment, the priority is determined according to the information of the frame to be output from the output unit 724, not limited to this case, the priority may be determined according to the information of a frame input from the input unit 721.

Further, while the data flow priority is determined according to the Layer 2 frame, not limited to this case, the information processing apparatus 700 may determine the data flow priority according to a Layer 3 packet.

Figure 20:
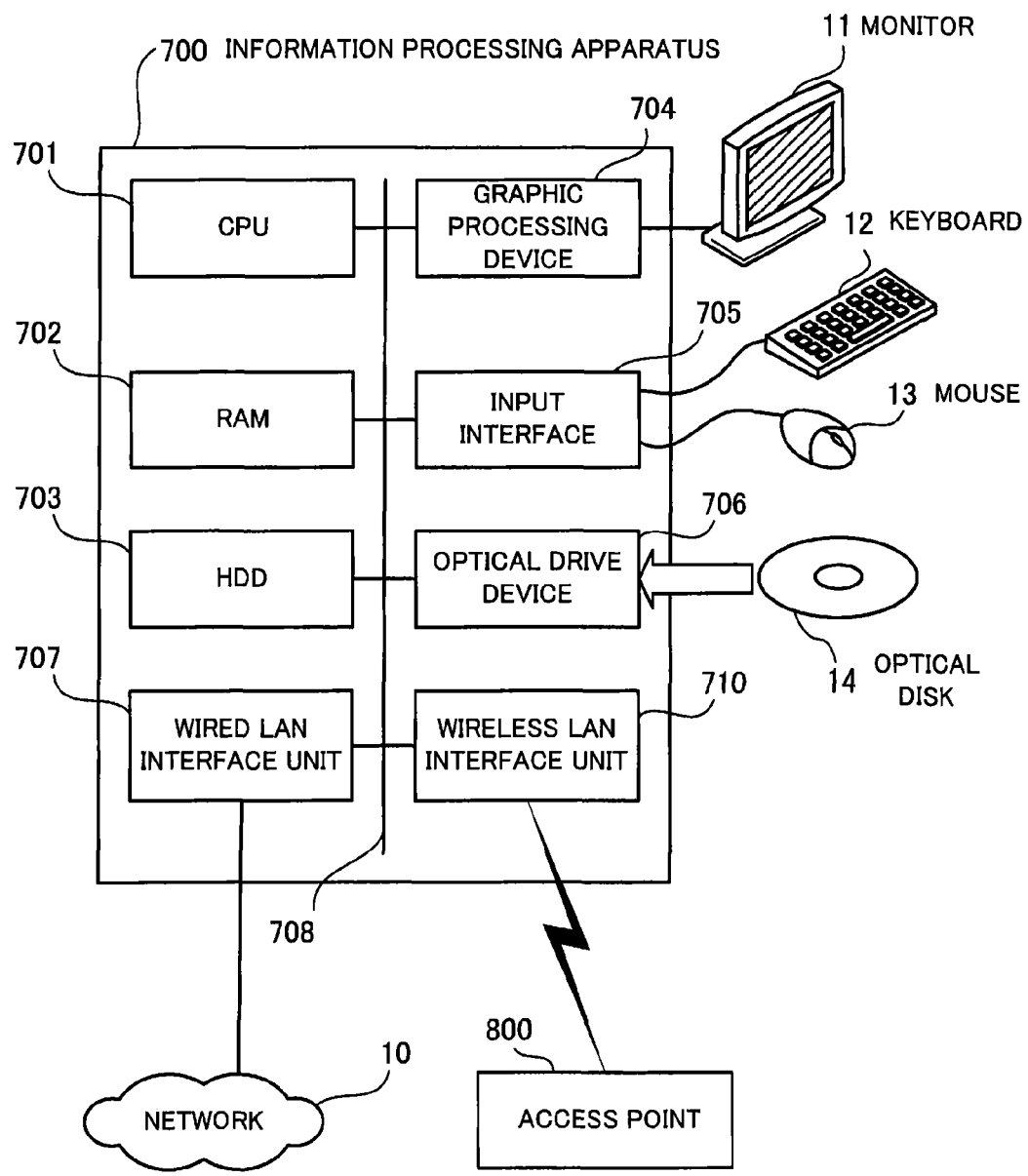
FIG. 20 illustrates a hardware configuration of the information processing apparatus of the fourth embodiment.

FIG. 20 illustrates a hardware configuration of the information processing apparatus of the fourth embodiment. In the information processing apparatus 700, the entire apparatus is controlled by a CPU 701. The CPU 701 is connected with a RAM 702 and plural peripheral devices via a bus 708.

The RAM 702 is used as a main storage device of the information processing apparatus 700. In the RAM 702, at least a part of an OS program and an application program for causing the CPU 701 to perform execution are stored temporarily. Further, various kinds of data required for processing by the CPU 701 are stored in the RAM 702.

The peripheral devices connected to the bus 708 include a hard disk drive (HDD) 703, a graphic processing device 704, an input interface 705, an optical drive device 706, a wired LAN interface unit 707 and a wireless LAN interface unit 710.

The HDD 703 performs write-in and read-out of data magnetically for a built-in disk. The HDD 703 is used as a secondary storage device of the information processing apparatus 700. The HDD 703 stores the OS program, the application program, and various kinds of data. Note that a semiconductor storage device such as a flash memory may be used as the secondary storage device.

The graphic processing device 704 is connected with a monitor 11. The graphic processing device 704 causes the monitor 11 to display an image according to an instruction from the CPU 701. As the monitor 11, a display device using a CRT (Cathode Ray Tube), a liquid crystal display device, or the like may be used.

The input interface 705 is connected with a keyboard 12 and a mouse 13. The input interface 705 transmits a signal transferred from the keyboard 12 and the mouse 13 to the CPU 701. Note that the mouse 13 is an example of a pointing device, and another pointing device may be used. As another pointing device, a touch panel, a tablet, a touch pad, a track ball or the like may be used.

The optical drive device 706 performs read-out of data recorded on an optical disk 14 utilizing a laser beam or the like. The optical disk 14 is a portable type recording medium on which data is recorded so as to be readable by light reflection. As the optical disk 14, a DVD (Digital Versatile Disk), a DVD-RAM, a CD (Compact Disk)-ROM, a CD-R (Recordable)/RW (Writable) or the like may be used.

The wired LAN interface unit 707 is connected to a network 10 configured with a LAN. The wired LAN interface unit 707 performs data transmission and reception with another computer or a communication apparatus via the network 10.

The wireless LAN interface unit 710 is connectable with the access point 800 or a communication apparatus by the wireless LAN. The wireless LAN interface unit 710 performs data transmission and reception with the access point 800 or the communication apparatus via the wireless LAN. Details of the wireless LAN interface unit 710 are the same as the details of the wireless LAN interface unit 110 described previously in FIG. 3 and explanation will be omitted.

By a hardware configuration as described above, it is possible to realize a processing function of the present embodiment.

Figure 21:
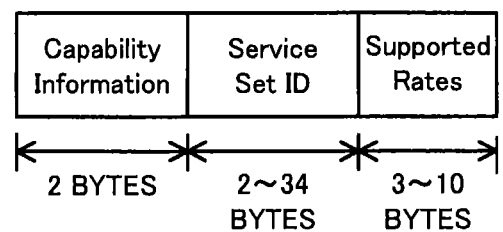
FIG. 21 illustrates a data structure example of a Probe Request frame for a wireless LAN of the fourth embodiment.

FIG. 21 illustrates a data structure example of a Probe Request frame for the wireless LAN of the fourth embodiment. In the present embodiment, the Probe Request frame illustrated in FIG. 21 is transmitted from the wireless LAN interface unit 710 of the information processing apparatus 700 to the access point 800 by the broadcast communication and thereby active scanning is performed.

The Probe Request frame illustrated in FIG. 21 includes Capability Information of a 2-byte region, Service Set ID of a 2 to 34-byte region, and Supported Rates of a 3 to 10-byte region.

Here, Supported Rates is a region where the link speed is set corresponding to the frame priority determined by the information processing apparatus 700 in speed control processing of the present embodiment. Probe Request including this Supported Rates in which the link speed is set is transmitted from the information processing apparatus 700 to the access point 800 and thereby the link speed corresponding to the priority of the frame transmitted or received in the wireless LAN between the access point 800 and the information processing apparatus 700 is notified to the access point 800.

Figure 22:
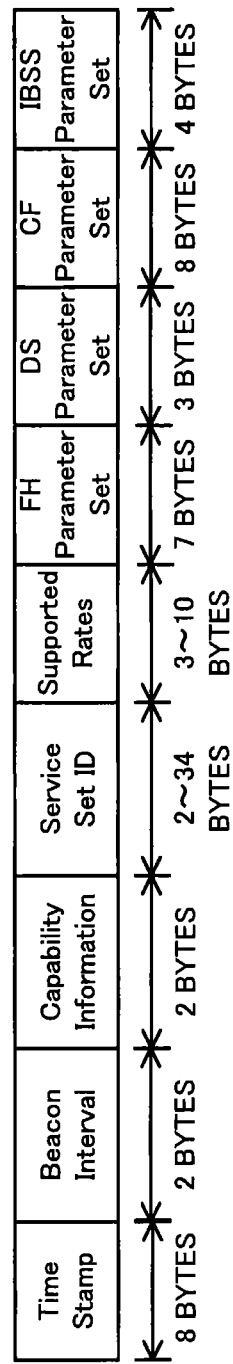
FIG. 22 illustrates a data structure example in a Probe Response frame of the wireless LAN of the fourth embodiment.

FIG. 22 illustrates a data structure example of a Probe Response frame of the wireless LAN of the fourth embodiment. In the present embodiment, the Probe Response frame illustrated in FIG. 22 is transmitted from the access point 800 to the wireless LAN interface unit 710 of the information processing apparatus 700 as a response to the Probe Request frame, which has been transmitted from the wireless LAN interface unit 710 of the information processing apparatus 700 to the access point 800.

The Probe Response frame illustrated in FIG. 22 includes Time Stamp of an 8-byte region, Beacon Interval of a 2-byte region, Capability Information of a 2-byte region, Service Set ID of a 2 to 34-byte region, Supported Rates of a 3 to 10-byte region, FH Parameter Set of a 7-byte region, DS Parameter Set of a 3-byte region, CF parameter Set of an 8-byte region, and IBSS Parameter Set of a 4-byte region.

Here, Supported Rates is a region where the link speed is set by the access point 800 in the speed control processing of the present embodiment. Probe Response including this Supported Rates in which the link speed is set is transmitted from the access point 800 to the information processing apparatus 700 and thereby the wireless LAN link speed between the access pint 800 and the information processing apparatus 700 is controlled.

Note that, as the frame data structure, various variation examples may be considered depending on a network operation mode and the like. For example, there is a case in which information other than the information described in the present embodiment is added. On the other hand, sometimes a part of the information described in the present embodiment is omitted.

Figure 23:
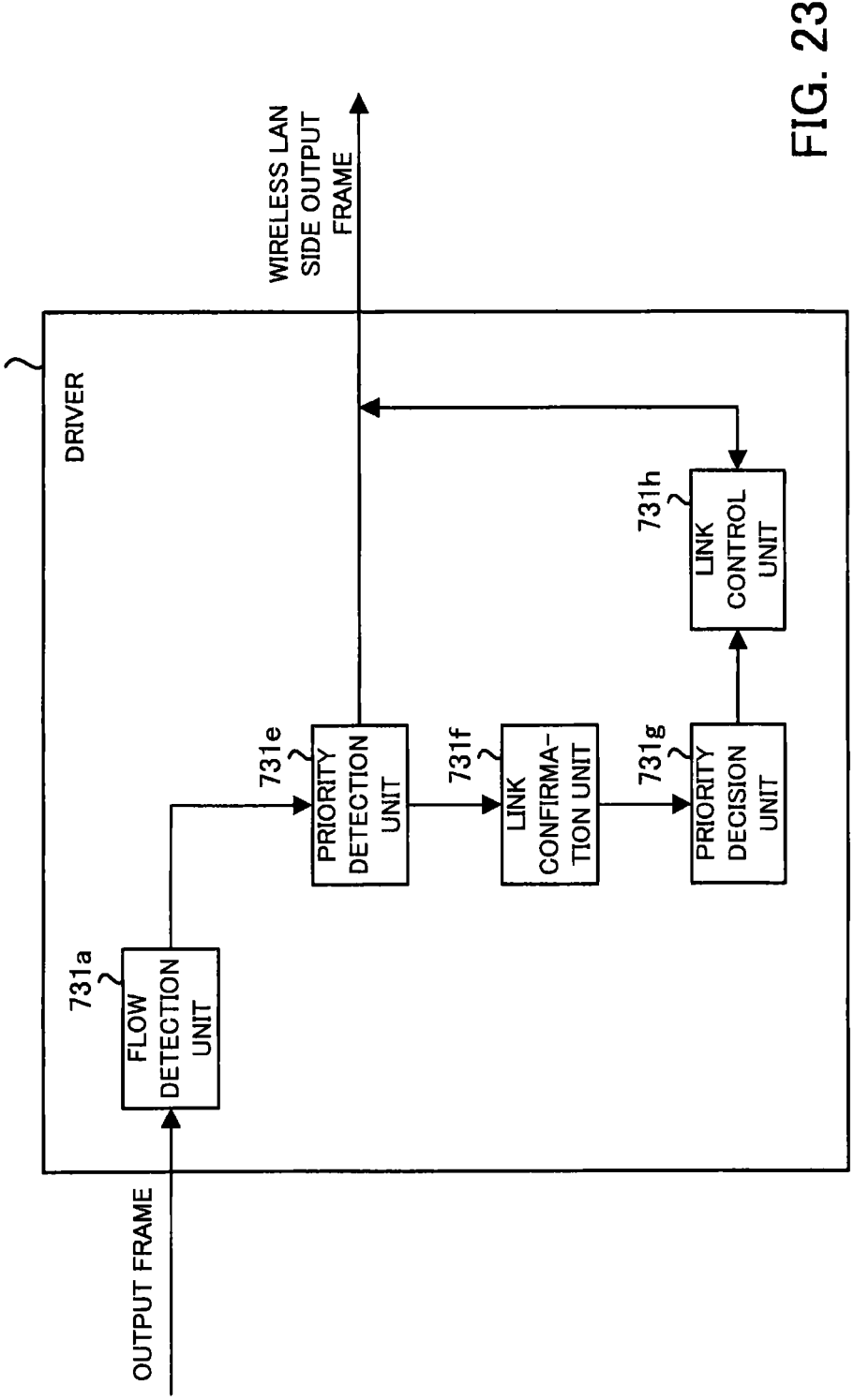
FIG. 23 is a block diagram illustrating configuration of a driver of the fourth embodiment.

FIG. 23 is a block diagram illustrating a driver configuration of the fourth embodiment. A driver 731 functioning in the information processing apparatus 700 illustrated in FIG. 19 outputs the output frame to be output from the information processing apparatus 700 to the access point 800 and the like which are connected by the wireless LAN. The driver 731 includes a flow detection unit 731a, a priority detection unit 731e, a link confirmation unit 731f, a priority decision unit 731g, and a link control unit 731h.

The flow detection unit 731a detects the flow to be transmitted from the information processing apparatus 700 in the wireless LAN according to the control information of the frame.

The priority detection unit 731e detects the data flow priority from the control information of the frame to be transmitted from the information processing apparatus 700 and controls the link control unit 731h.

The link confirmation unit 731f confirms a link state such as the link speed of the wireless LAN between the information processing apparatus 700 and the access point 800 and maintains link state data indicating the previous link state.

The link control unit 731h changes the link communication speed of the wireless LAN transmitting the data, according to the priority detection result by the priority detection unit 731e and the current link speed confirmed by the link confirmation unit 731f. According to the control by the link control unit 731h, the communication speed is controlled for the wireless LAN frame to be output from the wireless LAN interface unit 710.

Figure 24:
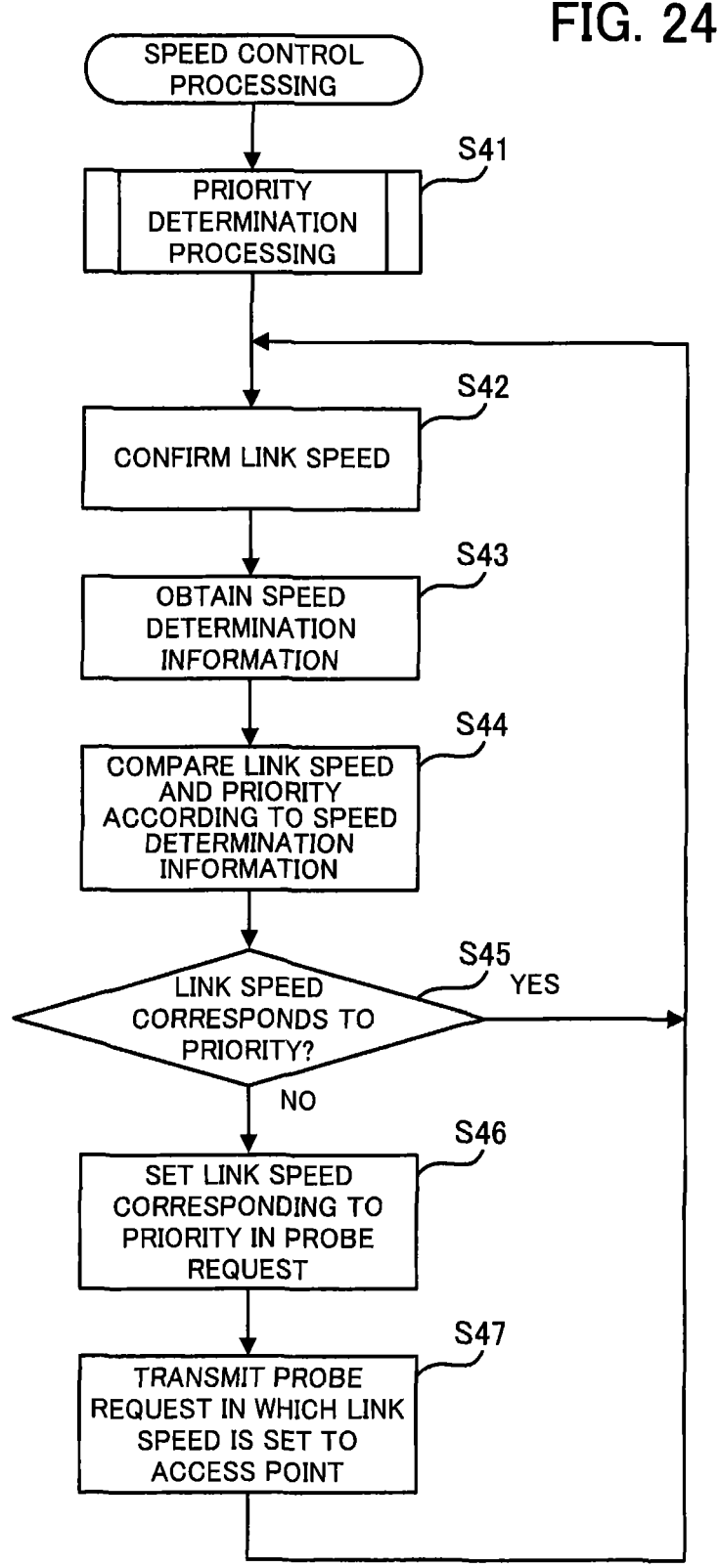
FIG. 24 is a flowchart illustrating a procedure of speed control processing of the fourth embodiment.

FIG. 24 is a flowchart illustrating a procedure of the speed control processing of the fourth embodiment. The speed control processing illustrated in FIG. 24 is processing of controlling the link speed according to the data flow priority in the information processing apparatus 700. The speed control processing of the present embodiment is executed in response to communication start of the information processing apparatus 700.

[Step S41] The priority determination unit 722 executes priority determination processing.

[Step S42] The speed control unit 723 confirms the link speed used in the wireless LAN.

[Step S43] The speed control unit 723 obtains the speed determination information stored in the speed-determination-information storage unit 752.

[Step S44] The speed control unit 723 compares the frame priority determined in Step S41 and the link speed confirmed in Step S42 according to the speed determination information obtained in Step S43. At this time, when the frame including the QoS data is not detected for a predetermined time or longer, the speed control unit 723 does not detect the frame priority and compares the link speed by setting the priority to be lower than the priority when the frame including the QoS data is detected.

[Step S45] The speed control unit 723 determines whether the frame priority and the link speed, which have been compared in Step S44, correspond to each other or not. When the frame priority and the link speed correspond to each other (YES in Step S45), the process proceeds to Step S42. On the other hand, when the frame priority and the link speed does not correspond to each other (NO in Step S45), the process proceeds to S46.

[Step S46] The speed control unit 723 sets the link speed, which corresponds to the priority determined in Step S41, to Probe Request.

[Step S47] The speed control unit 723 transmits Probe Request in which the link speed is set in Step S46 to the access point 800 of a connection destination. Thereby, communication is performed with the access point 800 by the wireless LAN having the link speed corresponding to the priority determined in Step S41.

Note that, while, in the speed control processing of the present embodiment, the speed determination information is obtained in Step S43 after the link speed has been confirmed in Step S42, not limited to this case, the link speed may be confirmed after the speed determination information has been obtained.

Figure 25:
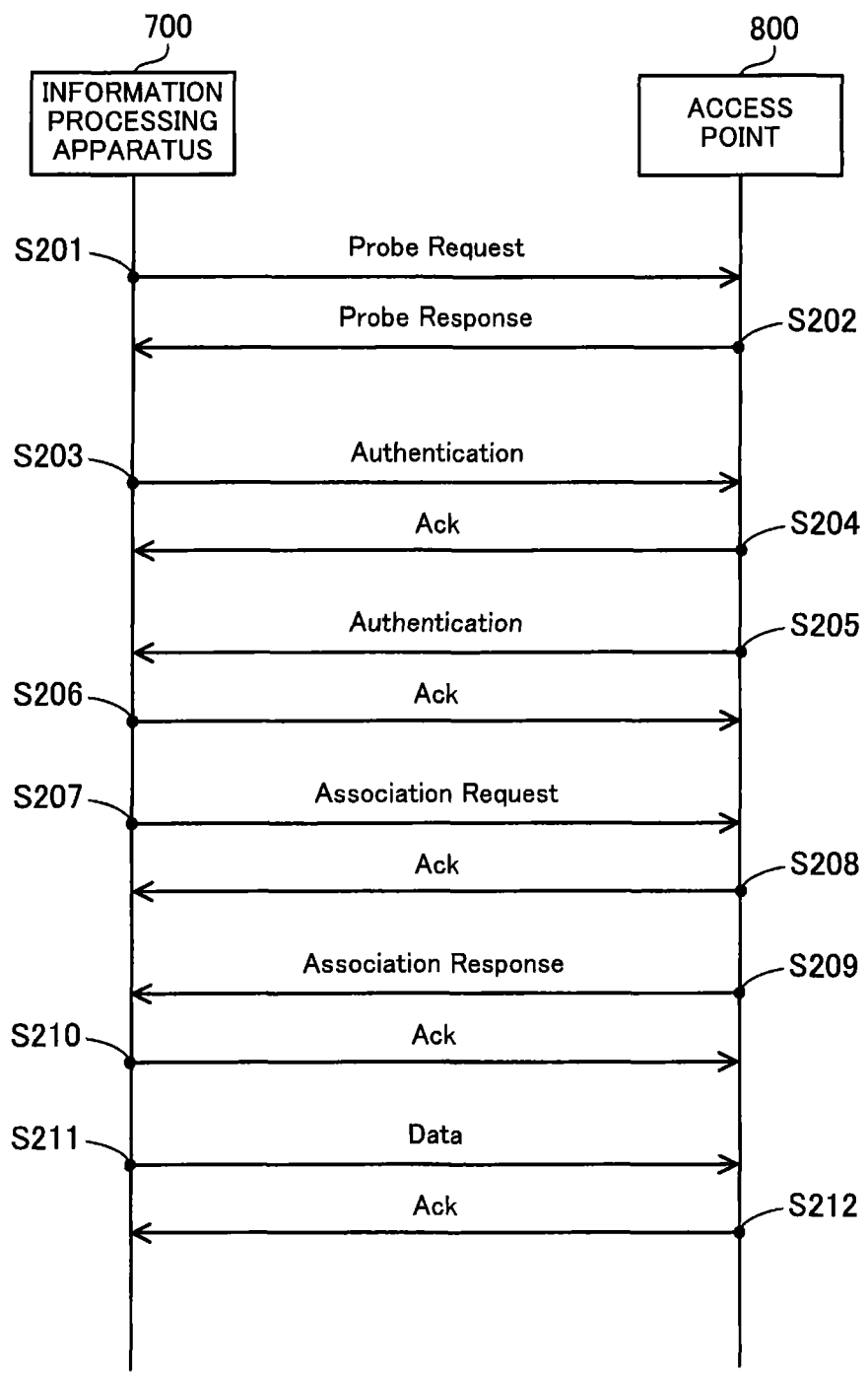
FIG. 25 is a sequence chart illustrating a procedure of link connection of the fourth embodiment.

FIG. 25 is a sequence chart illustrating a procedure of link connection of the fourth embodiment.

In the present embodiment, the information processing apparatus 700 transmits Probe Request by the active scanning when link connection is started or the link speed is changed. At this time, the information processing apparatus 700 performs transmission by setting the link speed according to the frame priority into Probe Request to be transmitted. The access point 800 of the connection destination, when having received this Probe Request, performs setting of the wireless LAN communication at the link speed set in the received Probe Request. Thereby, the wireless LAN link is established at a speed according to the frame priority between the information processing apparatus 700 and the access point 800. In the following, according to FIG. 25, the procedure will be explained up to the link establishment of the wireless LAN between the information processing apparatus 700 and the access point 800.

[Step S201] The information processing apparatus 700 transmits Probe Request in which the link speed is set corresponding to the frame priority, to the access point 800. Thereby, the link speed corresponding to the frame priority is notified to the access point 800.

[Step S202] The access point 800, when having received Probe Request transmitted from the information processing apparatus 700 in Step S201, transmits Probe Response to the information processing apparatus 700.

[Step S203] The information processing apparatus 700, when having received Probe Response transmitted from the access point 800 in Step S202, transmits Authentication to the access point 800.

[Step S204] The access point 800, when having received Authentication transmitted from the information processing apparatus 700 in Step S203, transmits Ack for Authentication to the information processing apparatus 700.

[Step S205] The access point 800 transmits Authentication to the information processing apparatus 700.

[Step S206] The information processing apparatus 700, when having received Authentication transmitted from the access point 800 in Step S205, transmits Ack for Authentication to the access point 800.

[Step S207] The information processing apparatus 700 transmits Association Request to the access point 800.

[Step S208] The access point 800, when having received Association Request transmitted from the information processing apparatus 700 in Step S207, transmits Ack for Association Request to the information processing apparatus 700.

[Step S209] The access point 800 transmits Association Response to the information processing apparatus 700.

[Step S210] The information processing apparatus 700, when having received Association Response transmitted from the access point 800 in Step S209, transmits Ack for Association Response to the access point 800. Thereby, communication by the wireless LAN is established at a link speed corresponding to the frame priority between the access point 800 and the information processing apparatus 700.

[Step S211] The information processing apparatus 700 transmits Data to the access point 800

[Step S212] The access point 800, when having received Data transmitted from the information processing apparatus 700 in Step S211, transmits Ack for Data to the information processing apparatus 700.

As described above, according to the fourth embodiment, it is possible to set the communication speed by setting the data flow priority in the information processing apparatus 700 used by a user on the client side of the communication. That is, the information processing apparatus 700 is capable of setting the data flow priority according to the determination of the user or the application. Thereby, it is also possible to set the priority flexibly and minutely compared to the case of determining the data flow priority formally and mechanically depending on the kind of the frame or the packet, for example.

Further, the information processing apparatus 700 includes the function of setting the link communication speed according to the priority, and thereby it is possible to establish the link at an appropriate communication speed also when the data is transmitted from the information processing apparatus 700, in the wireless LAN between the information processing apparatus 700 of the client side and a wireless communication apparatus such as the access point 800, and the power saving effect becomes larger.

Note that the above processing function may be realized by a computer. In this case, a program is provided describing the processing contents of the function to be included in the access point 100, the access point 600, or the information processing apparatus 700. The above processing function is realized on the computer when this program is executed by the computer.

The program describing the processing contents may be recorded in a computer-readable recording medium. The computer readable recording medium includes a magnetic recording apparatus, an optical disk, a magneto-optical recording medium, a semiconductor memory, and the like. The magnetic recording apparatus includes an HDD, a flexible disk (FD), a magnetic tape (MT), and the like. The optical disk includes, a DVD, a DVD-RAM, a CD-ROM, a CD-R/RW, and the like. The magneto-optical recording medium includes MO (Magneto-Optical disk) and the like.

When the above program is distributed, a portable type recording medium recording the program such as a DVD and a CD-ROM is sold, for example. Further, the program may be stored in a server computer and the program may be transferred from the sever computer to another computer through a network.

The computer executing the above program stores the program recorded in the portable recording medium or the program transferred from the server computer, into an own storage device, for example. Then, the computer reads out the program from the own storage device and executes processing according to the program. Note that the computer may read out the program directly from the portable recording medium and execute processing according to the program. Further, the computer, every time the program is transferred from the server computer, may execute processing sequentially according to the received program.

According to the wireless communication apparatus, the information processing apparatus, and the wireless communication control method to be disclosed, it becomes possible to suppress communication speed of data having lower priority and realize power saving by changing the communication speed according to data priority in wireless communication.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A wireless communication apparatus, comprising:
an input unit configured to input data;
a priority determination unit configured to determine priority of the data;
an output unit configured to output the data by wireless communication at a set communication speed;
a speed control unit configured to set the communication speed of the wireless communication of the data to be output from the output unit according to the priority of the data determined by the priority determination unit, and also, when input of the data is not detected, to set the communication speed of the wireless communication of the data to be output from the output unit to be lower than the communication speed to be set when the input of the data is detected;
a priority-conversion-information storage unit configured to store priority conversion information which converts data priority of wired communication to data priority of wireless communication; and
a priority conversion unit configured to convert priority of the data input by the input unit into priority of wireless communication according to the priority conversion information stored in the priority-conversion-information storage unit;
wherein the input unit inputs the data, and the priority determination unit determines the priority of wireless communication of the data whose priority has been converted by the priority conversion unit.

2. The wireless communication apparatus according to claim 1, wherein
the data includes priority information which indicates a priority order in communication of the data, and
the priority determination unit determines the priority of the data according to the priority information included in the data input from the input unit.

3. The wireless communication apparatus according to claim 1, wherein
the data includes destination address information indicating an address of a transmission destination of the data, and
the priority determination unit, when the destination address information included in the data which is input from the input unit indicates a predetermined address, determines the priority of the data to be higher than the priority to be determined when the destination address information indicates an address other than the predetermined address.

4. The wireless communication apparatus according to claim 3, wherein
the destination address information indicates a MAC address of the transmission destination of the data, and
the data is transmitted and received in a frame including the destination address information indicated by the MAC address.

5. The wireless communication apparatus according to claim 3, wherein
the destination address information indicates an IP address of the transmission destination of the data, and
the data is transmitted and received in a packet including the destination address information indicated by the IP address.

6. The wireless communication apparatus according to claim 1, wherein
the data includes port number information indicating a port number of a transmission destination of the data, and
the priority determination unit, when the port number information included in the data which is input from the input unit indicates the predetermined port number, determines the priority of the data to be higher than the priority to be determined when the port number information is a port number other than the predetermined port number.

7. The wireless communication apparatus according to claim 1, wherein
the output unit causes a control signal which controls link establishment with a transmission destination of the data to include information indicating the communication speed according to a determination result of the priority by the priority determination unit and transmits the control signal to the transmission destination of the data, thereby changing setting of the communication speed with the transmission destination to the communication speed according to the determination result of the priority.

8. The wireless communication apparatus according to claim 1, wherein
the speed control unit, when input of the data is not detected for a predetermined time, sets the communication speed of the wireless communication of the data to be output from the output unit to be lower than the communication speed to be set when the input of the data is detected.

9. The wireless communication apparatus according to claim 1, comprising
a speed-determination-information storage unit configured to store speed determination information which indicates a correspondence relationship between the priority of the data and the communication speed of the wireless communication, wherein
the speed control unit sets the communication speed of the wireless communication of the data to be output from the output unit according to the priority of the data which has been determined by the priority determination unit, based on the speed determination information stored in the speed-determination-information storage unit, and also, when input of the data is not detected, sets the communication speed of the wireless communication of the data to be output from the output unit to be lower than the communication speed to be set when the input of the data is detected.

10. An information processing apparatus, comprising:
   a priority determination unit configured to determine priority of data;
   an output unit configured to output the data by wireless communication at a set communication speed;
   a speed control unit configured to set the communication speed of the wireless communication of the data to be output from the output unit according to the priority of the data determined by the priority determination unit and also, when output of the data is not detected, to set the communication speed of the wireless communication of the data to be output from the output unit to be lower than the communication speed to be set when the output of the data is detected;
   a priority-conversion-information storage unit configured to store priority conversion information which converts data priority of wired communication to data priority of wireless communication; and
   a priority conversion unit configured to convert priority of the data input by an input unit into priority of wireless communication according to the priority conversion information stored in the priority-conversion-information storage unit;
   wherein the input unit inputs the data, and the priority determination unit determines the priority of wireless communication of the data whose priority has been converted by the priority conversion unit.

11. The information processing apparatus according to claim 10, wherein the speed control unit, when output of the data is not detected for a predetermined time, sets the communication speed of the wireless communication of the data to be output from the output unit to be lower than the communication speed to be set when the output of the data is detected.

12. A wireless communication control method comprising:
   determining, by a priority determination unit, priority of data input from an input unit;
   setting, by a speed control unit, a communication speed of wireless communication of the data to be output from an output unit according to the priority of the data determined by the priority determination unit and also, when input of the data is not detected, setting the communication speed of the wireless communication of the data to be output from the output unit to be lower than the communication speed to be set when the input of the data is detected;
   storing, by a priority-conversion-information storage unit, priority conversion information which converts data priority of wired communication to data priority of wireless communication; and
   converting, by a priority conversion unit, priority of the data input by the input unit into priority of wireless communication according to the priority conversion information stored in the priority-conversion-information storage unit;
   wherein the input unit inputs the data, and the priority determination unit determines the priority of wireless communication of the data whose priority has been converted by the priority conversion unit.

* * * * *